US008436316B2

(12) United States Patent
Taleyarkhan

(10) Patent No.: US 8,436,316 B2
(45) Date of Patent: May 7, 2013

(54) COMPOSITIONS AND METHODS FOR DETERMINING DIRECTIONALITY OF RADIATION

(75) Inventor: Rusi P. Taleyarkhan, Lafayette, IN (US)

(73) Assignee: Sagamore/Adams Laboratories LLC, Chicago, IL (US)

(*) Notice: Subject to any disclaimer, the term of this patent is extended or adjusted under 35 U.S.C. 154(b) by 386 days.

(21) Appl. No.: 12/988,949

(22) PCT Filed: Apr. 29, 2010

(86) PCT No.: PCT/US2010/032991
§ 371 (c)(1),
(2), (4) Date: Oct. 21, 2010

(87) PCT Pub. No.: WO2010/127131
PCT Pub. Date: Nov. 4, 2010

(65) Prior Publication Data
US 2011/0174990 A1    Jul. 21, 2011

Related U.S. Application Data

(60) Provisional application No. 61/174,159, filed on Apr. 30, 2009.

(51) Int. Cl.
*G01T 3/00* (2006.01)
(52) U.S. Cl.
USPC ..................................... 250/390.12; 250/391
(58) Field of Classification Search ............. 250/390.12, 250/391
See application file for complete search history.

(56) References Cited

U.S. PATENT DOCUMENTS

| | | | |
|---|---|---|---|
| 3,991,313 A | 11/1976 | Leschek | |
| 4,172,226 A | 10/1979 | Rubin | |
| 4,350,607 A | 9/1982 | Apfel | |
| 4,689,986 A | 9/1987 | Carson | |
| 5,235,524 A * | 8/1993 | Barkhoudarian | 702/39 |
| 5,345,084 A * | 9/1994 | Byrd | 250/390.12 |
| 5,633,584 A | 5/1997 | Maryanski | |
| 5,784,339 A | 7/1998 | Woodsum | |
| 6,178,141 B1 | 1/2001 | Duckworth | |
| 6,406,429 B1 * | 6/2002 | Bar-Cohen et al. | 600/438 |
| 2005/0254345 A1 | 11/2005 | Ferrell | |
| 2006/0061237 A1 | 3/2006 | Ikeda | |
| 2006/0269033 A1 | 11/2006 | Taleyarkhan | |
| 2007/0055157 A1 | 3/2007 | Bohris | |

OTHER PUBLICATIONS

West; Cavitation Bubble Nucleation by Energetic Particles, Oak Ridge National Laboratory, Report [online] Jan. 12, 1999, ORNL/TM-13683 Dec. 1998.
International Search Report from corresponding PCT application No. PCT/US10/32991; dated Oct. 27, 2010.

* cited by examiner

*Primary Examiner* — Constantine Hannaher
(74) *Attorney, Agent, or Firm* — Robert M. Gould; Husch Blackwell LLP

(57) ABSTRACT

A method of determining directionality of radiation is disclosed which comprises dividing the tensioned metastable fluid liquid volume adjacent to a radioactive source into a plurality of sectors, determining the opposing sector ratio of the respective sector and determining the direction of the radiation based on the opposing sector ratios of the plurality of sectors. The method further comprising determining directionality of incoming radiation from the tension pressure assisted elongation of bubble shapes pointing towards direction of radiation particles that interacted with nuclei of tensioned metastable fluid detector system. A device capable of carrying out these methods is also disclosed.

43 Claims, 18 Drawing Sheets

COMPOSITIONS AND METHODS FOR DETERMINING DIRECTIONALITY OF RADIATION

PRIORITY

This application claims the benefit of U.S. Provisional Application No. 61/174,159 filed Apr. 30, 2009, the entire contents of which are incorporated herein by reference.

INVENTION MADE WITH U.S. GOVERNMENT SUPPORT

This invention was made with Government Support under Contract No. HR0011-05-C-0141 awarded by the Defense Advanced Projects Research Agency. The Government has certain rights in this invention.

TECHNICAL FIELD

The present disclosure relates to a method of determining directionality of radiation. More specifically, the present disclosure relates to a method of determining directionality of radiation using a tensioned metastable fluid detection system.

BACKGROUND

Radiation cannot be detected by human senses. A variety of handheld and laboratory instruments is available for detecting and measuring radiation, such as Geiger counters. However, these devices do not provide information about the direction from which the radiation emanates.

BRIEF SUMMARY

This disclosure provides compositions and methods for determining the direction of incoming radiation.

One method of determining directionality of radiation involves dividing a tensioned metastable volume of fluid in a chamber into a plurality of sectors, placing the fluid in the proximity of a radiation source and detecting radiation induced cavitation nucleation events in various regions or sectors within the chamber, determining the opposing sector ratio of the number of cavitations in the respective sectors and determining the direction of the radioactive source based on the opposing sector cavitation ratios in the plurality of sectors.

A neutron detection system is disclosed that has the ability to give directional information about the source. Rather than relying on neutron or other radiation (e.g., photon) interactions that give no directional information about the origin of the radiation being detected, an acoustic tensioned metastable fluid detection (ATMFD) system can be used to show which direction the radiation is coming from.

While the ATMFD system is operating, the probability that a neutron/radiation induced cavitation event will occur is a function of the tensioned or negative pressure in the fluid and the neutron/radiation flux. One embodiment relies upon an acoustic tensioned metastable fluid in which the pressure profile is nearly axially symmetric on a horizontal plane such that all points that are equally distant from the center will have substantially the same negative pressure. In such a system the cavitation probability is a function of neutron/radiation flux. Since neutron/radiation flux from a source decreases with distance and with the degree of down scattering and absorption, the side sector of the detector closest to the source has a higher probability of detection. By detecting the location of a sample set of cavitation events, directional information can be determined by observing an imbalance in the locations of cavitation events.

The location of a neutron/radiation detection nucleation site can be determined by recording the time at which the resulting cavitation induced shockwave reaches various locations on the detector wall. Any number of transducers can be incorporated into the detector in order to determine the location of the source of cavitation induced shock waves. Any suitable number of transducers can be used so long as directional information can be obtained. For example, four (approximately 7 mm OD) piezoelectric transducers can be used to detect the arrival of the shockwave from the cavitation event. At least two, preferably three or more of the signal detection transducers can be in a plane and one or more signal detection transducers can be outside that plane. The signals from the four transducers can then be processed to derive desired information on directionality. Additionally, directional information may also be obtained from monitoring of the bubble shapes at the time, and after cavitation events occur. Such cavitation bubbles generated from neutron/radiation strike on to nuclei of atoms in the acoustically tensioned pressure field of the ATMFD liquid preferentially extend themselves in elliptical like shapes pointing in the direction of incoming radiation.

The preferred ATMFD systems described herein have the ability to:

Detect SNM neutrons over eight orders of magnitude,
Detect alpha particles,
Maintain virtually complete insensitivity to gamma photons,
Operate with intrinsic efficiency of about 90%,
Provide real-time directional information of incoming radiation.

Benchmarking and qualification studies have been conducted with Pu-based neutron-gamma and photon light sources. This disclosure provides the modeling cum-experimental framework along with a demonstration of the operation of the ATMFD system.

DETAILED DESCRIPTION OF THE PREFERRED EMBODIMENTS

Figure 1A:
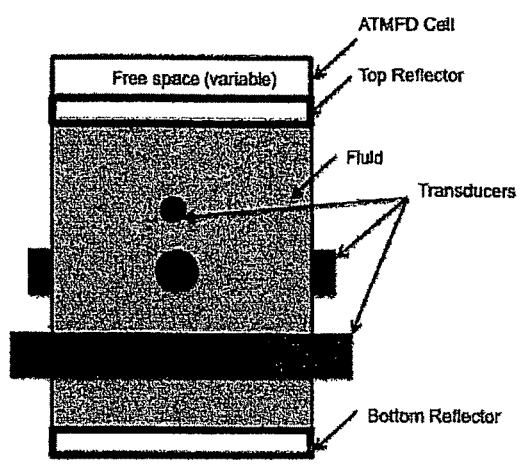
FIG. 1 provides schematic views of ATMFD resonant chambers (a) having multiple disk transducers positioned with the hollow cylinder transducer or (b) separately with multiple transducers positioned spaced apart.

In one method the capacity to detect nuclear particles can be provided by tensioned metastable fluid states which can be attained via tailored resonant acoustic systems such as acoustic tensioned metastable fluid detector (ATMFD). Radiation detection in tensioned metastable fluids can be accomplished via macro-mechanical manifestations derived from the femtoscale nuclear interactions. Incident nuclear particles can interact with the dynamically tensioned metastable fluid wherein the intermolecular bonds are sufficiently weakened such that the recoil of ionized nuclei generates nano-scale vapor cavities which grow to visible scales. Ionized nuclei form preferentially closest to the incoming radiation, thereby providing for the first time the capability to ascertain information on directionality of incoming radiation.

The present disclosure provides advancements in the detection of a broader range of nuclear particles, the detection of neutrons over an energy range of eight orders of magnitude, improved intrinsic detection efficiencies beyond 90%, and in ascertaining directionality information of incoming radiation than has previously been possible. In one example, the present disclosure provides a composition and method which increases the accuracy and precision of ascertaining directionality information utilizing enhanced signal processing cum-signal analysis, refined computational algorithms, and on demand enlargement of the detector sensitive volume.

Advances in the development of ATMFD systems can be accomplished through the use of a combination of experimental and theoretical modeling. Modeling methodologies include Monte-Carlo based nuclear particle transport using MCNP5 and complex multi-physics based assessments accounting for acoustic, structural, and electromagnetic coupling of the ATMFD system via a computer software (COMSOL®) multiphysics simulation platform. Benchmarking and qualification studies have been conducted with special nuclear materials (SNMs), including Pu-based neutron-gamma sources. The results show that the ATMFD system, in its current configuration, is capable of locating the direction of a radioactive source at least to within about 30° with about 80% confidence or more.

A First Embodiment

Radiation detection in tensioned metastable fluids is based, in part, on the principle that incident nuclear particles interact with a tensioned fluid wherein the intermolecular bonds are sufficiently weakened such that nuclear particles are capable of triggering a localized explosive phase change in the fluid. A liquid in a tensile state is metastable below its thermal equilibrium state, unlike a superheated liquid which is in a state of thermal superheat which is above its normal boiling point. Tension in fluids is analogous to the stretching of solid structures. The energy required to tear apart the intermolecular bonds of a solid decreases as the tension in the structure increases. In an analogous manner, the excess trigger energy required to break the intermolecular bonds between liquid molecules decreases with increasing tension metastability; eventually resulting in spontaneous triggering of explosive phase change at the spinodal limit of tension. Below this stability limit, excess energy is required to trigger phase change of the tensioned metastable fluid. This excess energy can be provided via interaction with nuclear particles (e.g., neutrons, alphas, photons, betas, fission products, etc.) or even with visible light photons. This property enables the amplification of femto-scale nuclear scale particles to relatively large ($\times 10^{13}$) macroscopic scales therefore allowing for new low-cost, ultra-sensitive detectors for nuclear engineering and scientific applications such as the acoustically tensioned metastable fluid based detection system (ATMFD) described herein.

This disclosure is directed to the directional detection of neutrons in the MeV range (e.g., those neutrons emitted by special nuclear materials such as U, Pu, Cf, Am, Cm, etc.) via direct knock-on collisions with the detector fluid.

The ATMFD approach appears capable of not only detecting the energy and intensity of incident radiation, but also ascertaining information on the location of the radioactive source, a feature of significant potential use in widespread fields, including identifying the tell-tale neutron emission signatures from SNMs for homeland security. Directional information is ascertainable in the ATMFD system due to the increased probability that a neutron induced detection event will occur in the regional sector of the tensioned fluid volume nearest the source. The probability that a neutron induced detection event will occur is a function of the negative pressure in the detector fluid and the neutron flux and energy. Since the pressure profile is nearly axi-symmetric, the probability of detection events is a function of the neutron flux and energy. Since neutron flux of a given energy from a source decreases with distance and with the degree of down scattering and absorption, the side of the sensitive volume nearest the source has the highest probability of detection. Detecting the location of these detection events inside the detector allows the user to ascertain information on the direction of the radioactive source. The present disclosure provides an improved mechanistic treatment of directionality determination.

Nomenclature

Figure 1B:
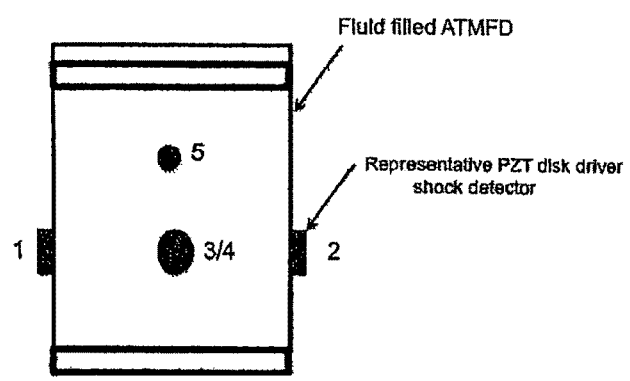

ATMFD—Acoustic tension metastable fluid detector
COMSOL®—COMSOL® multiphysics computer simulation platform
GPIB—General purpose interface bus (IEEE 488)
GPS—Global positioning system
LABVIEW®—computer software for industrial automation and scientific and engineering data acquisition, control and analysis
LET—Linear energy transfer (also dE/dx)
PuBe—Plutonium beryllium neutron source
PZT—Lead zirconate titanate
Mic—Microphone
MCNP5—Monte Carlo n-Particle Version 5
OD—Outer diameter
SDD—Superheated droplet detector
SNM—Special nuclear material
TDOA—Time difference of arrival (also 't)
TMFD—Tension metastable fluid detector
V1—Sensitive volume (or sector) nearest the source
V2—Sensitive volume (or sector) farthest from source
XatMaxY—Time in of the highest peak relative to the trigger point.
XatMinY—Time in of the lowest peak relative to the trigger point ATMFD Design Any suitable fluid chamber can be used so long as the chamber can be used to create a tensioned metastable fluid, preferably an acoustic tensioned metastable fluid, in which a fluid pressure profile can be created that is nearly axially symmetric such that all points that are equally distant from the central axis will have substantially the same negative pressure, a cylinder for example. Due to manufacturing issues, cylinders of glass can involve slight (~40-100 micron type) deviations in thickness and diameter along the circumference and length. As a consequence, the true central axis of a resonance chamber can shift from the centerline. Such a shift can create asymmetry in the oscillating pressure profiles in the radial and axial directions. Such variations can be accounted for up-front by system system characterization. For example by transient oscillating pressure mapping over a range of frequencies of interest to find the true central axis. For practical systems, the fluctuating pressures from the geometrical central axis will generally be substantially the same, albeit, somewhat skewed but to a known level such that adjustments can be made when deriving directionality related information. In certain embodiments suitable chambers will have the characteristic that they can be mechanically deformed in transient fashion from pulses from an external transducer, in a manner that generates a standing acoustic wave in the fluid housed by the chamber. The chamber in certain embodiments has a size and shape that allows for the directional detection of radiation that permits down scattering assisted collection of bubble cavitation events in various regions of the chamber. The pressure wave can consist of oscillating positive and negative pressures, such that the negative pressures are in a range above the spinodal limit of tension but which allows the energy released by interaction of nuclear particles with fluid molecules to trigger a phase change also known as a bubble nucleation or cavitation event. Generally, when freon-113 is the fluid, the negative pressure is thought to be about −2.5 bar or lower in the presence of ~4 MeV neutrons from an SNM such as from a Pu—Be source. Where acetone is the test liquid the negative pressure is about −3.5 bar or lower. The required negative pressure is variable with the external neutron energy and can be calibrated a priori by comparing against neutron sources of known energy (e.g., from accelerator systems or mixtures of alpha emitting isotopic sources such as Am—Be, Am—Li, Am—B, Am—C, Am—Fl and the like). Suitable chambers can be manufactured from quartz, glass (preferably Pyrex glass), ceramics, polycarbonates, and a number of metals, as is known in the art. In one embodiment, a resonant acoustic chamber can have an outside diameter of approximately 70 mm and 150 mm long cylindrical quartz tube having a hemispherical top and bottom. A schematic of this ATMFD is shown in FIG. 1a. Other dimensions can be chosen as well to fit needs related to frequency of operation. The chamber can be filled with a fluid and is generally sealed. The chamber can be adapted with a mechanism for focusing acoustic energy within the fluid in the chamber. Acoustic energy can be focused within the fluid inside the chamber by any suitable means, for example a hollow glass or quartz reflector placed at the top of the test fluid and a similar hollow glass or quartz reflector placed at the bottom of the chamber can be used. Plastics, TEFLON® polytetrafluoroethylenes (PTFE) or polycarbonates may be used if they are not attacked chemically by the working fluid. A concentrically ring shaped piezoelectric transducer made of lead-zirconate titanate (PZT) can be affixed by standard methods (mechanical or epoxy glue-based) to the outside of the chamber and used to power the acoustic resonance chamber. Suitable transducers can be made of any material that can induce acoustic resonance within the fluid, suitable materials include ceramic materials such as barium titanate, lead zirconate titanate (PZT), among other materials, as are known. It is not necessary to use a concentric ring shaped hollow cylinder. This is especially true for large diameter ATMFDs where large circular concentric ring transducers become increasingly more difficult to procure. As an alternate, multiple disks such as circular, rectangular or other shaped transducers may be positioned as shown schematically in FIG. 1b either together with the hollow cylinder as in FIG. 1a, or by themselves as shown in FIG. 1b. In such a situation, about 4 such disks are positioned in a given plane and act as drive transducers. The fifth is mounted at a higher elevation and may be of significant smaller size—the purpose being to receive shock signals. The four in the same plane act to not only provide drive power but also to receive shock signals from imploding bubbles. In both cases, the thickness and size for a given material control the capacitance and resonance frequency of the transducers. For example, for a hollow ring transducer, the capacitance is directly proportional to the height of the ring and inversely proportional to the natural logarithm of the ratio of outer to inner diameters of the hollow cylinder, respectively. For a circular disk transducer which is polarized in either planar or the thickness direction, the capacitance is directly proportional to the square of the diameter and inversely proportional to the thickness. These transducers are best utilized in such manner that their resonance matches the mechanical resonance of the test cell enclosure. For the 70 mm OD and 150 mm long test cell shown in FIG. 1 the mechanical resonance frequency (when filled with acetone) amounts to around 20 kHz and the capacitance of the ring transducer is around 20 nF. For the disk transducers of FIG. 1b, the disk transducers should be selected for the 70 mm OD test cell with a capacitance around 20 nF as well but with dimensions selected to provide a resonance frequency of around 20 kHz. For larger diameter systems the mechanical resonance will roughly vary inversely with the ratio of diameters of the systems involved to a good first order approximation (e.g., for a system with a diameter of 140 mm OD, the mechanical resonance thus may be expected to drop down to approximately 10 kHz) and the capacitance of the transducers must therefore, be adjusted accordingly to bring the resonance frequency of the transducer to become close to 10 kHz as well, such that maximum efficiency of drive power is attainable. A more refined estimate of mechanical resonance of the system—one that includes multi-dimensional 3-D effects, may be estimated via direct pressure mapping of the test cell at various elevations in the test liquid over a range of frequencies wherein, one would readily find the frequency at which pressure oscillations reach their highest levels. Alternately, a multi-physics modeling and simulation scheme may also be employed, as shown later with use of the COMSOL®-multiphysics simulation platform.

Transducers can be affixed to the chamber using a coupling agent such as an adhesive. Suitable coupling agents will have a suitable impedance which essentially matches the product of density and sound velocity in the medium to the driver transducer and the driven structure receiving the mechanical impulses from the high frequency oscillating transducers. The coupling agent is chosen so that it minimizes acoustic energy scattering and/or wasting, such as by dissipation into heat. As an example, epoxy can be used to affix the transducers to the chamber walls. Trapped bubbles which adversely affect the coupling are to be avoided when using epoxy. Glass frit can be mixed in with the epoxy to improve the coupling impedance but the quantity of glass used must be limited so as not to overly weaken the epoxy bonding properties. An adhesive casting product, such as STYCAST® can also be used to affix transducers. Metals that are liquids at room temperature, such as galinstan—a eutectic mixture of Ga, In and Sn or other fluids with extremely low vapor pressure, such as tetradecane or glycerine can also be used as coupling agents. Acoustic energy is transmitted readily through such agents. The edge of the cavity holding such fluids that transmit acoustic energy from the transducer to the glass wall may be sealed around the edge with epoxies or silicon rubber (RTV-like) cements.

Many fluids may find use in the ATMFD such fluids include acetone, freon, benzene, isopentane, trimethyl borate, water, and the like, are all contemplated for use in the present invention. Detector fluids having higher hydrogen contents can be used to increase the effect of down scattering on the neutron flux ratio which in turn may enhance the resolution of directionality determination at large standoff.

The ATMFD devices can be refurbished such as by replacing transducers or refilling the fluid in the gap between the chamber and the transducer. In the process care must be exercised during removal of epoxy or during refilling so as not to destroy the PZT transducers which can easily crack or malfunction.

To operate the device a sinusoidal signal amplified by a linear amplifier can be used to drive the piezoelectric transducer which can be polarized in the radial or axial direction. A piezoelectric material when extended in a given direction will shrink in the direction at right angles to that first direction. The need for driving perturbations largely in the radial direction was the reason for choosing hollow cylindrical PZT transducers polarized in the radial direction; the electrode leads are on the inner and outer surfaces of the rings. Vertically polarized hollow cylindrical PZTs are also available where the electrode leads are on the lips and may also be used. Alternatively, banks of flat disk piezoelectric transducers may also be affixed (mechanically or via glue/epoxy) to the glass surface and then driven individually or in parallel. Such a bank of drive transducers serve a dual purpose; first, to provide drive power to the ATMFD, and then, also to serve as pickup devices for the shock signals arriving from collapsing cavitation bubbles; the shock signals being superimposed on to the main drive frequency. In such a case, the need for additional small microphones is dispensed with, or alternately, may be used to derive more acoustic information related to ATMFD performance and directionality monitoring. When in resonance, the mechanical deformation of the quartz/glass/ceramic/metal chamber of the present dimensions can be used to generate a standing acoustic wave consisting of oscillating positive and negative (i.e., sub-vacuum) pressures in the 20 kHz range. During the time the fluid molecules are under negative pressure, the state is metastable whereupon, nuclear particle strikes from incident radiation can be generated.

Modeling and Simulation

Two simulation tools can be used in the characterization of the ATMFD system: COMSOL® multiphysics a finite element multiphysics program and MCNP5—a nuclear particle transport code. COMSOL® allows for the coupling of acoustic, fluid, and structural models of the resonant acoustic system. MCNP can be utilized to evaluate the combined spatial and energy dependent physical aspects effecting the neutron flux and energy spectrum over the sensitive volume of the ATMFD.

Finite Element Simulation

A model of the resonant acoustic chamber can be developed utilizing COMSOL's® structural mechanics module including stress-strain and piezoelectric effects analysis and the acoustic wave transport module together with electromagnetic coupling. Due to the complexity of the problem, the COMSOL® model utilizes finite element methods to solve the problem in the frequency domain.

Figure 2:
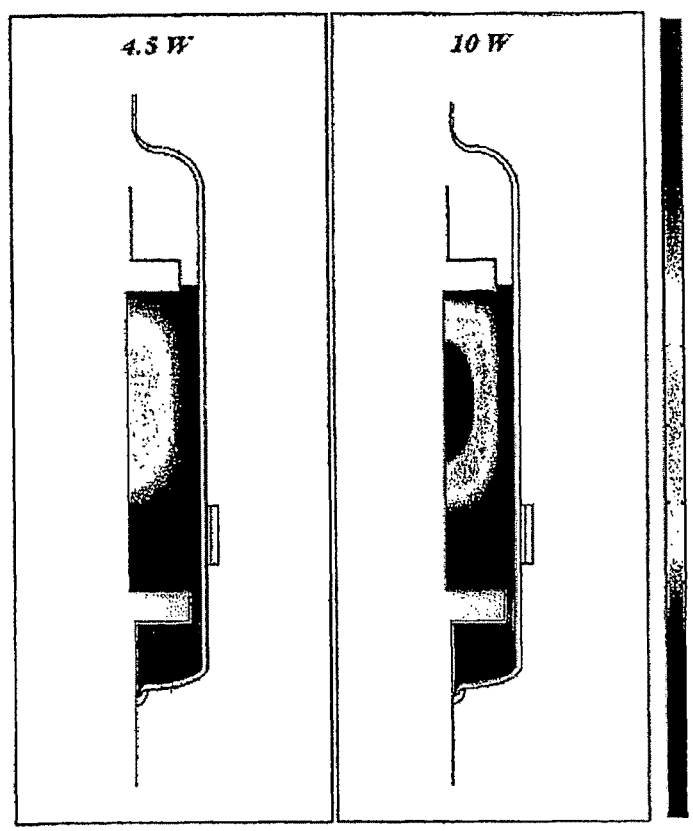
FIG. 2 is a schematic view of pressure distributions in a chamber at about 4.5 W and about 10 W.

Similar models using ethylene glycol and acetone as the host liquid have been benchmarked against experimental data for the pressure distribution and frequency spectra response. The ATMFD system was modeled as axi-symmetric, symmetric about a central axis. The detector fluid used in the model was pure acetone at about 25° C. FIG. 2 shows the relationship between variations in the drive power applied to the PZT and the spatial characteristics of the sensitive volume of the chamber at the resonant frequency of about 18.78 kHz. In the current detector configuration, the sensitive volume of the chamber can be defined as the volume of the chamber in which the oscillating negative pressure fluctuations are at or below −3.5 bar, which is the threshold negative pressure for detection of fast (MeV) neutrons in acetone.

As can be seen from FIG. 2, a modest doubling in drive power from about 4.5 W to 10 W resulted in a linear increase of the sensitive volume from about 50 $cm^3$ to about 100 $cm^3$. Larger sensitive volumes in the detector not only increase the effective detection efficiency, allowing for more neutrons to interact in the sensitive volume of the chamber, but also increase the radial dimension of the sensitive volume which can be used to increase the resolution of directional information and increase detection efficiency.

Monte Carlo Simulation

Nuclear particle transport assessments can be performed using the MCNP5 code developed at Los Alamos National Laboratory, New Mexico, USA. The model consists of the ATMFD's resonant chamber and a PuBe neutron source (emitting about $2 \times 10^6$ n/s) at a distance of about 20.3 cm from the central axis of the chamber. The chamber can be modeled as axi-symmetric. Suitable structural materials including the reflectors can be quartz, the piezoelectric transducers can be lead zirconate titanate (PZT), and the working fluid can be acetone ($C_3H_6O$). The portion above the top reflector, inside the top and bottom reflectors and outside the chamber can be modeled as air.

Figure 3:
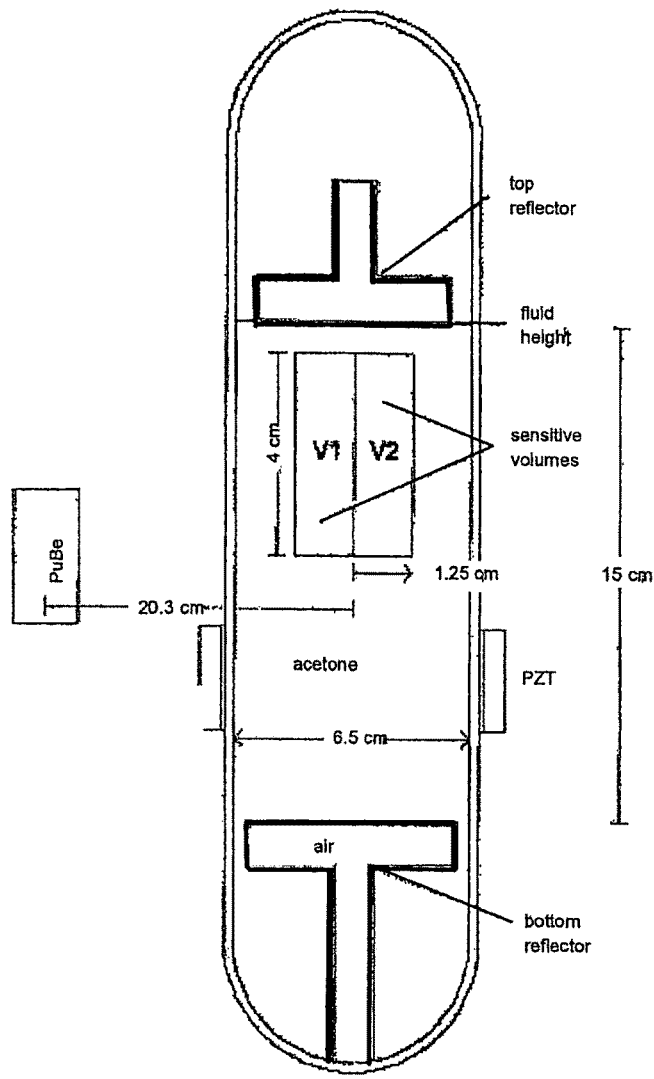
FIG. 3 is a not-to-scale view of the geometry of an MCNP input deck.

According to this method two regional sensitive volumes are defined in the detector fluid as seen in FIG. 3. The cylinder (r=about 1.25 cm and h=about 4 cm) defining the sensitive volume can be divided into two halves; one half facing the source (V1) and one half facing away from the source (V2). The two half cylinders formed the neutron tally volumes. The neutron energy spectrum for a bare PuBe source can be used and all cross sections are evaluated at about 300 K. All assessments can be calculated to within about 1% relative error.

Results of MCNP5 simulations demonstrate about a 23% higher neutron flux in V1 relative to V2. By comparing the solid angles subtended by the two sensitive volumes to the PuBe source, the spatial effects by themselves result in ~13% higher flux in V1 than V2. In comparison, down scattering accounts for about a 10% higher fast neutron flux in V1. This shows that as the source to detector distance increases, effectively reducing and eventually nullifying any possible contributions from spatial effects, the detection in the ATMFD will still be preferential to and discernable as favoring the region nearest the source.

Figure 4:
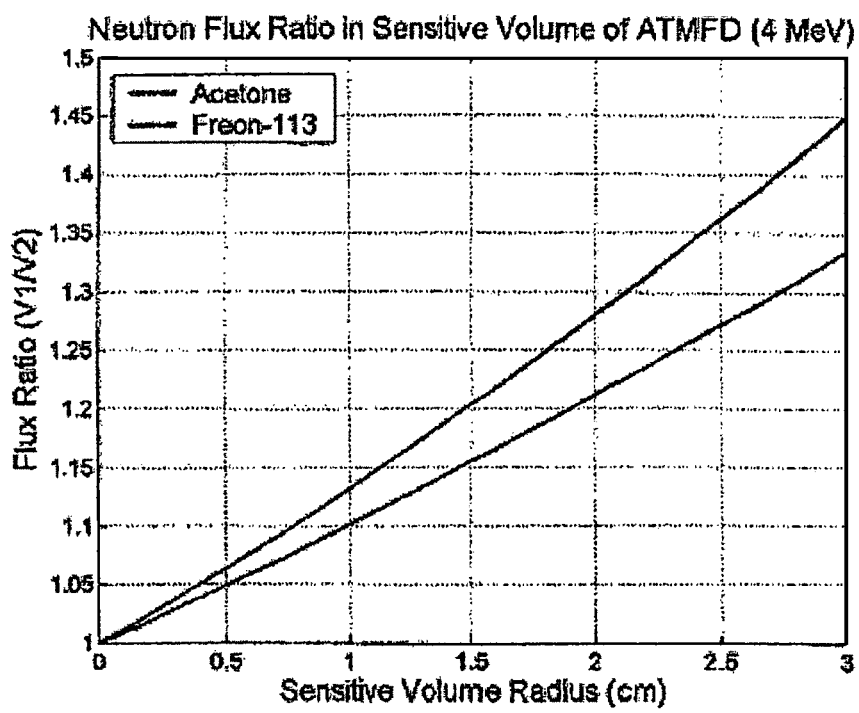
FIG. 4 is a schematic view of neutron flux ratio at large standoff for acetone and Freon-113.

Calculations based on the exponential attenuation law allow for a quantitative estimate of the relationship between the effect of down scattering on the neutron flux ratio and the size of the sensitive volume. A second fluid, Freon-113 (commonly used in tension metastable fluid based detector systems), is included for comparison. The PuBe source emits neutrons with an average energy of about 4 MeV which have a mean free path, $\lambda$, of about 5 cm in acetone and about 10 cm in Freon-113. The results are shown in FIG. 4. The effects of down scattering on the neutron flux ratio increases proportionally with the sensitive volume size. The ability to increase the amount of directional information available is observed when the source is far enough away such that solid angle effects on the magnitude of the neutron flux are small. The effects of down scattering are also dependent on the composition of the detector fluid. As seen from FIG. 4, down scattering has a larger effect in acetone compared to Freon-113. This is primarily attributable to the higher hydrogen content (and therefore lower $\lambda$) of MeV neutrons in acetone. Different detector fluids having higher hydrogen contents can be used to increase the effect of down scattering on the neutron flux ratio which in turn may enhance the resolution of directionality determination at large standoff. Thus, fluids such as acetone, freon, benzene, isopentane, trimethyl borate, water and the like are all contemplated for use in the present invention.

Automation

The ability to decipher directionality requires acquisition of hundreds to thousands of detection signals and then rapid analysis to then result in an answer with high enough confidence (e.g., >75%) within seconds to minutes. Automation is highly desirable for practical systems. The violent collapse of the imploding vapor cavity formed by a nuclear particle interaction causes an audible click that can be heard several feet away from the chamber. The audible clicks from the collapsing vapor cavities can be recorded using four tiny MHz response piezoelectric transducers which can be affixed to the outside of the resonant chamber. Hardware and LABVIEW® based virtual instrument software based control systems are developed to record these detection events and to extract information on the direction of the radioactive source.

Figure 5:
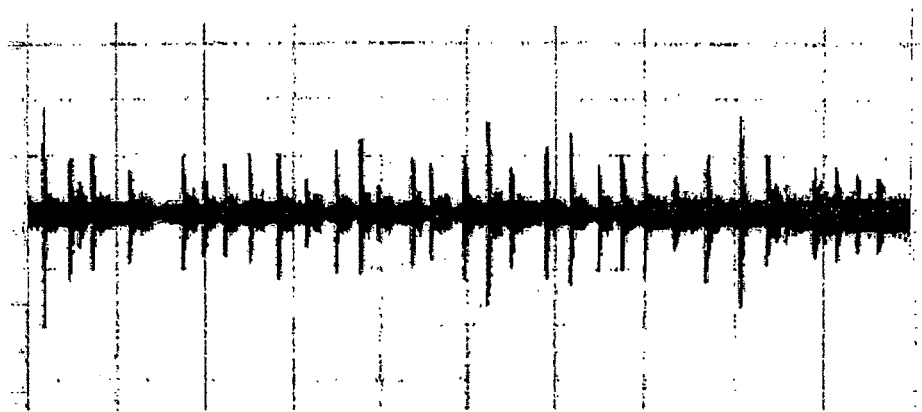
FIG. 5 is a schematic view of the screenshot of shock pulses before signal processing. The vertical scale is about 500 mV/div. The horizontal scale is about 100 ms/div.
Figure 6:
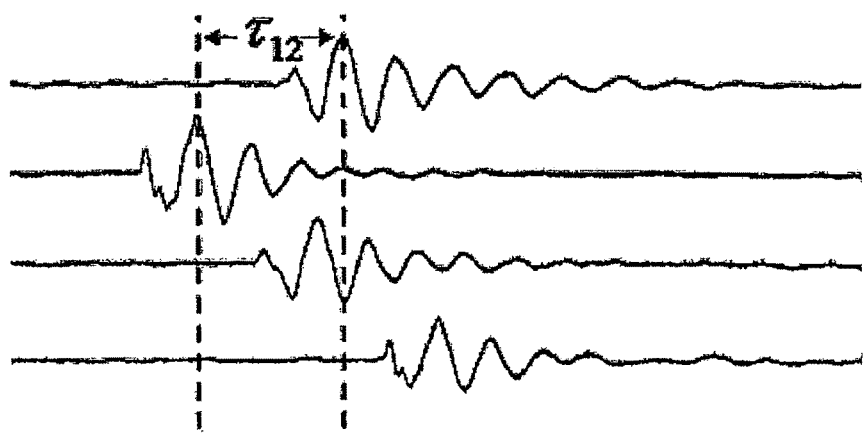
FIG. 6 is a schematic view of a screenshot of shock pulses analyzed for directionality information. The vertical scale is about 500 mV/div. The horizontal scale is about 5 µs/div.

The electrical signals from the piezoelectric transducers can be sent through a third order Butterworth high pass filter to eliminate the dominate drive frequency therefore isolating the high frequency components. The signals from the filter can then be sent to an Agilent™ 100 MHz digital storage oscilloscope for display, storage, and further signal processing. Screen shots of actual signals used in the experiment are shown in FIG. 5 and FIG. 6. The peaks in the signal are results of recorded neutron detection events which resulted in imploding vapor cavities thereby radiating shock signals that are detected by the PZT transducers.

A LABVIEW® based virtual instrument (VI) can be designed as a graphical user interface to not only control the operation of the ATMFD system but also collect and analyze experimental data. Experimental data can be acquired by the LABVIEW® virtual instrument via a GPIB interface with the oscilloscope. In one method once the data are acquired from the oscilloscope, the virtual instrument used two statistical techniques to validate the acquired electrical signal as a neutron detection event. Validation of the neutron detection events can take advantage of two characteristics of the shock traces. As can be seen from FIG. 6, the shock traces from neutron detection events have a high frequency (about 250 kHz) sinusoidal pulse shape. A further characteristic of the shock traces is that they are symmetrical. A measure of the symmetry of the shock traces, known as the skewness, can be calculated to determine if the electrical signal is that of a neutron detection event. This technique takes advantage of the random nature of noise (both electrical and mechanical) and helps eliminate false positives. The second technique that can be used is a measure of the similarity of two of the shock traces. In the case of a true neutron detection event, the recorded shock trace as seen by each transducer shock monitor should have substantially the same shape. The cross-correlation, or sliding dot product, of two of the shock traces can be calculated to ascertain how well the two individual shock traces match. The cross-correlation method also allows for the calculation of the time difference of arrival between the two shock traces. The time difference of arrival (r) is shown graphically in FIG. 6. The time difference of arrivals can then be analyzed with a hyperbolic positioning algorithm to calculate the location of the neutron detection event in the resonant chamber. The LABVIEW® virtual instrument then utilizes the locations of the neutron detection events to ascertain the direction of the neutron source and display it graphically to the user. The integral detection system designed for the ATMFD, from neutron detection event to ascertaining the direction of the neutron source, can be performed in near real time on the millisecond (ms) time scale.

Directionality Determination Experimentation and Results

Figure 7:
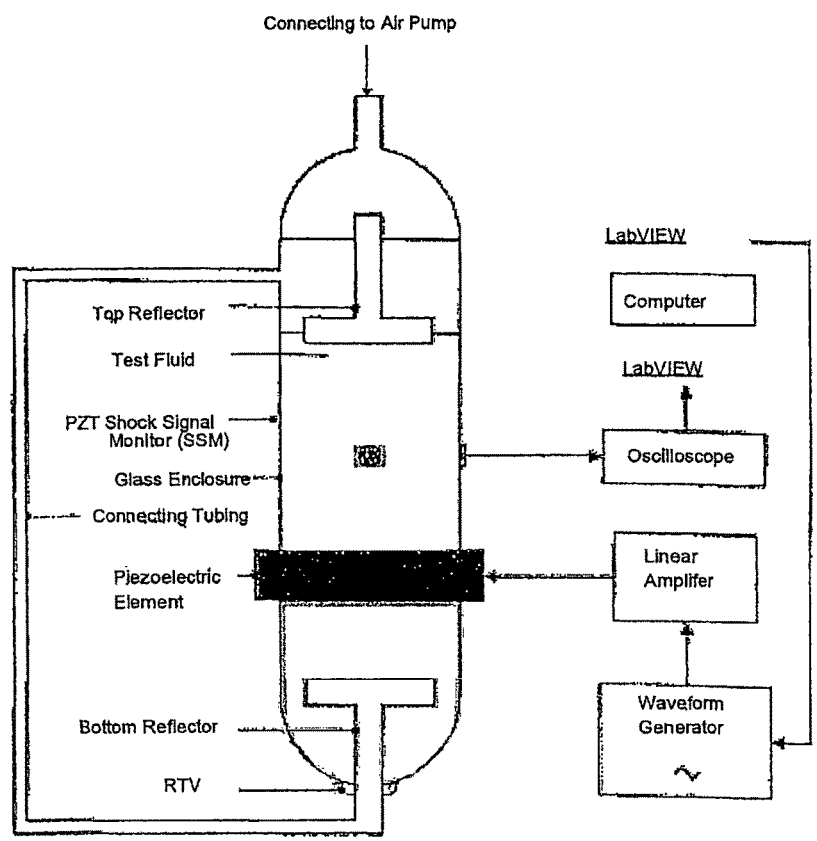
FIG. 7 is a schematic view of the experimental setup with directionality automation.

The experimental setup utilizes preferably, a quartz ATMFD chamber with OD of about 6.9 cm although, other shapes such as spheres and conical types made of Pyrex glass have also been tested successfully, as described in MCNP and COMSOL® models. The liquid used in the chamber was pure acetone at about 25° C. and under about 20 inches Hg of vacuum. The chamber was operated with a wave-form generator (Agilent, model 33120A) and a linear amplifier (Piezo Systems, Inc. model EPA-104). The resonant frequency was found at about 18.3 kHz, and the drive voltage used was about 96 V. Experimental data was taken utilizing an oscilloscope which recorded the shock traces. The LABVIEW® program was used to control the operation of the oscilloscope, collect data, and perform signal processing and analysis. Communication with the oscilloscope was accomplished via a GPIB interface. Four piezoelectric transducers were placed at right angles to each other on the same XY plane, with the exception of the fourth transducer which was placed with a positive Z component to allow for 3-D positioning. The setup is shown in FIG. 7.

Figure 8:
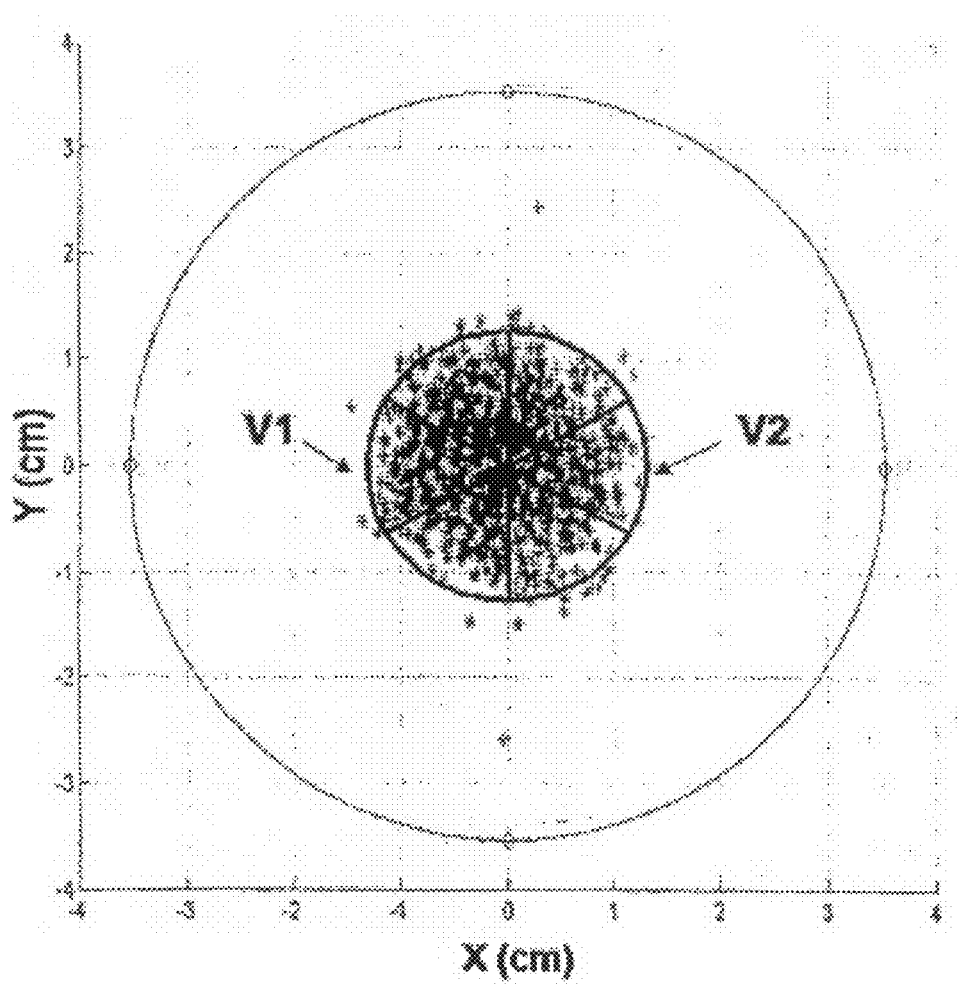
FIG. 8 is an axial cross-section view of positions of detection events using a PuBe source about −20.3 cm away from the center axis of chamber in line with Mic 1 and Mic 3.

Experimentation was performed with about a 1 Ci PuBe neutron-gamma source (emitting about $2\times10^6$ n/s) located about −20.3 cm and 20.3 cm from the center of the chamber on axis with Mic 1 and Mic 3. The TDOAs recorded were used to calculate the positions of the nucleation events and are shown in FIG. 8. Due to the high Q-factor of the system, small variations in the construction of the chamber result in a small variation between the geometrical center and the center of the sensitive volume that must be taken into account. The average position of the nucleation events in the XY plane was used to ascertain the center of the sensitive volume. The positions were adjusted accordingly. The graphs were first divided into two substantially equally sized semi-hemispherical volumes. The volume closest to the radioactive source, V1, contained about 55.2% (±2.5%) of the detection events, and only about 44.8% (±2.2%) of the detection events occur in V2. The resulting ratio of neutron detection events is given as about 1.23 (±0.07). As mentioned previously, the predicted ratio given by the MCNP model is about 1.23.

Further analysis of the positions of the neutron detection events was performed to determine the ability of the detector to better resolve the angular direction of the radioactive source. The sensitive volume was divided into 6 separate about 600 angular sectors. The total number of neutron detection events in each sector was calculated and compared to the number of neutron detection events occurring in the opposing sector. Similarly, a cylindrical mesh tally of the neutron flux in the sensitive volume was added to the MCNP simulation. When comparing opposing sectors, the sector nearest the radioactive source was observed to contain about 57.8% (±4.5%) of the neutron detection events, and only about 42.2% (±3.7%) of the neutron detection events occur in the sector furthest away from the radioactive source. The resulting ratio of neutron detection events was given as about 1.37 (±0.13) which again correlates with our prediction based on simulations of about 1.38. Again it is noted that the experimental results correlated to the theoretical model estimates within one standard deviation.

Figure 9:
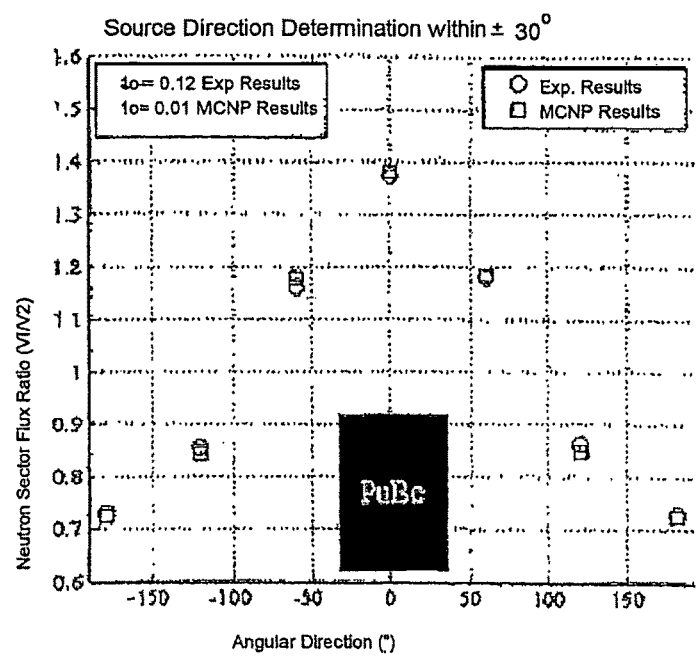
FIG. 9 is a schematic view of the determination of source direction within ±30°. Comparison of experimental results with MCNP simulation.

A study was performed to investigate the ability of the ATMFD system to detect the direction of a radioactive source positioned in an unknown location. The opposing sector ratios for all sectors were calculated and plotted in FIG. 9 in order to correctly determine the correct radioactive source direction. It was exceptionally clear that the sector pointing in the direction of the source had the highest opposing sector ratio. Logically, the second highest opposing sector ratio occurs in the sector directly adjoining the source direction sector. The sector ratio in the adjoining sector was given as about 1.16 (±0.11). The ratio predicted by the MCNP simulation is about 1.18, within one standard deviation of the experimental result. Analysis of the results shows that the ATMFD system is capable of locating the direction of the radioactive source to within 30° with about 80% confidence.

Figure 10:
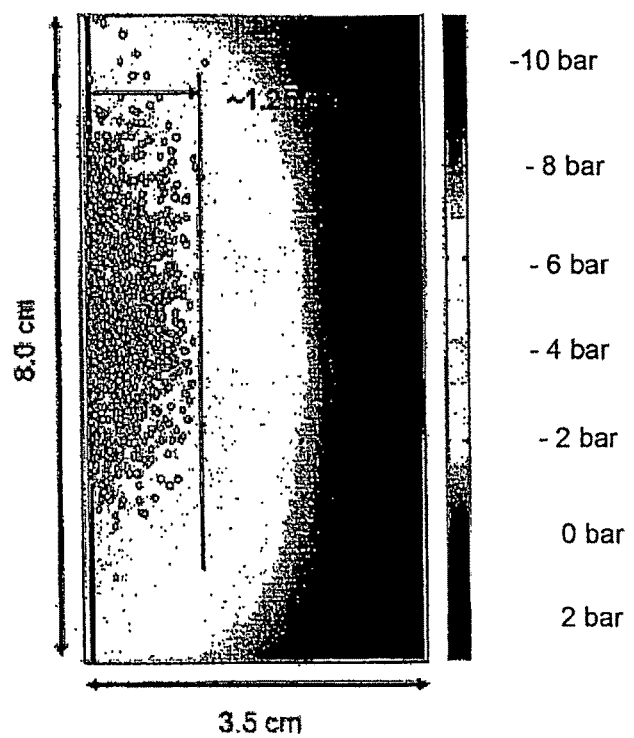
FIG. 10 is a schematic view of all neutron detection events as recorded, seen in rz plane, overlaid with computer software (COMSOL®) simulations at about 4.5 W.

Based on the principle that a higher pressure amplitude in the liquid provides a higher probability that a neutron induced nucleation event will occur, the pressure field inside the chamber was mapped by the distribution density and profile of neutron-induced bubble nucleation sites. Experimentation was done with the PuBe source about −20.3 cm and 20.3 cm from the center of the chamber on axis with Mic 1 and Mic 3 to prevent the directional nature of the detector from becoming a factor. The positions of the detection event sites were plotted in the RZ plane and overlaid on top of the sensitive volume pressure field predicted by the COMSOL® model. The results are shown in FIG. 10. Analysis of the results showed that the neutron induced detection events primarily occurred at pressures lower than about −4 bar, which correlates with the previously measured threshold of about −3.5 bar. It was also apparent that substantially all of the neutron detection events occurred within a radius of about 1.25 cm from the centerline of the ATMFD. Therefore the value of about 1.25 cm was used for the MCNP assessments.

This work demonstrates directionality determinations and also shows that the ATMFD system can be tailored to be insensitive to gamma radiation and that by changing the detector liquid to Freon-113 and trimethyl borate the ATMFD system can also be simultaneously used to detect neutrons with energies spanning eight orders of magnitude while operating with nearly 90% intrinsic detection efficiency. This is enabled via (n, p) reactions with Cl atoms of freon, and, (n, alpha) reactions with boron atoms in trimethyl borate.

A method for determining the direction of incoming radiation in near real time is described. The experimental evidence presented herein has shown that the locations of the neutron detection events occur preferentially on the side of the detector nearest the source with a ratio of about 1.23 (±0.07):1 which corresponds with our Monte Carlo based simulations (about 1.23:1). Calculations have been performed which show that the increase in solid angle from the sensitive volume nearest the source to furthest from the source accounts for about a 13% reduction in neutron flux. The down scattering of the neutrons through the acetone accounts for about a 10% reduction. The directional information may be intrinsically obtained with the ATMFD technology even when the source is far enough away such that solid angle effects on the magnitude of the neutron flux are negligible. These same calculations prove that the reduction of the neutron flux due to down scattering increases as the sensitive volume increases, therefore providing an avenue for increasing the accuracy and precision of the determination of the source direction at large standoffs. The COMSOL® coupled physics simulation is benchmarked with experimental neutron detection data and can have the ability to scale the sensitive volume of the detector by increasing the drive power therefore yielding increased accuracy and precision of the determination of the source direction and enhanced effective detection efficiency.

Further analysis of the locations of the neutron detection events can yield improved methods of directionality determination via opposing neutron flux sector ratios. The results show that the ATMFD system, in its current configuration, is capable of locating the direction of a radioactive source to within about 30° with about 80% confidence.

A Second Embodiment

In another embodiment, tension metastable fluid states offer a potential for advancements in radiation detection. Such metastable fluid states can be attained using tailored resonant acoustics to result in acoustic tension metastable fluid detection (ATMFD) systems. Present-day neutron detectors sometimes may be bulky, expensive, require different detector systems for various neutron energy groups and are not suited for providing information on which direction neutron radiation arrived. Radiation detection in ATMFD systems is based on the principle that incident nuclear particles interact with the dynamically tensioned fluid wherein the intermolecular bonds are sufficiently weakened such that even fundamental particles can be detected over eight orders of magnitude or more in energy with intrinsic efficiencies far above conventional detection systems. In the case of neutron-nuclei interactions the ionized recoil nucleus ejected from the target atom locally deposits its energy, effectively seeding the formation of vapor nuclei that grow from the sub-nano scale to visible scales such that it becomes possible to record the rate and timing of incoming radiation (neutrons, alphas, and photons). Nuclei form preferentially in the direction of incoming radiation. Imploding nuclei then result in shock waves that are readily possible to not only directly hear but also to monitor electronically at various points of the detector using time difference of arrival (TDOA) methods. In conjunction with hyperbolic positioning, the convolution of the resulting spatio-temporal information provides for the first time not just the rate of incident neutron radiation but also its directionality.

The development of intrinsic-efficiency, low-cost, and rugged, ATMFD systems can be accomplished using a combination of experimentation-cum-theoretical modeling. Modeling methodologies include Monte-Carlo based nuclear particle transport using MCNP5, and also complex multi-dimensional electromagnetic-cum-fluid structural assessments with COMSOL's® multiphysics simulation platform. ATMFD system automation was accomplished with the programming of virtual instrument (VI) control algorithms using LAB-VIEW® software.

Liquids like solids can withstand tension (i.e., they can sustain sub-vacuum pressures before tearing apart). A liquid in a tensile state is metastable below its thermal equilibrium state, unlike a metastable liquid in a state of thermal superheat which is above its normal boiling point. Tension in fluids is analogous to the stretching (versus compression) of solid structures. The energy required to tear apart the intermolecular bonds of a solid decreases as the structure is stretched. In an analogous manner, the energy required to break the bonds between liquid molecules decreases with increasing tension metastability; eventually resulting in spontaneous triggering of explosive phase change at the spinodal (thermodynamic stability) limit of tension.

Explosive phase change can be triggered in metastable liquids below the stability limit. This triggering causes explosive vaporization of fast nucleating and expanding vapor pockets. The three possible methods of triggering explosive phase changes in metastable liquids are laser heating, nuclear particle (e.g., neutrons) knock-on collisions and acoustic energy. The following discussion will focus on triggering by means of neutron-nuclei knock-on collisions. Explosive phase changes can thus be initiated mechanically or via nuclear particles or photons from a laser. The rapid, pulsed energy deposition resulting from knock-on collisions between high energy particles, specifically neutrons, and individual nuclei of liquid molecules can cause nanoscale triggering and explosive phase change. The pulsed energy deposition of recoils from knock-on collisions is in the form of thermal energy and is deposited over about a few nanometers causing a vapor nucleus to form. The range in which the energy is deposited depends on the stopping power of the recoil ion in the liquid. If the thermal energy deposition rate is high enough to cause a vapor nucleus larger than the critical size the nucleus will continue to grow into a macroscopic vapor bubble. Critical radii are generally in the nanometer range and are reached in nanoseconds. Photons from a laser source can also be used to trigger explosive phase changes though more are needed because individual photons of visible light have a relatively small amount of energy (about 1 eV) and less linear energy transfer (LET) compared to fast (MeV) neutrons.

For example, an approximately 4 MeV neutron colliding with a carbon atom in acetone will, on average, transfer about 0.72 MeV to the carbon nucleus. This gives an energy density, where the volume is defined by the critical radius of an acetone vapor bubble (about 30 nm), of about 36.4 MJ/kg. In comparison, the latent heat of vaporization for acetone is about 0.534 MJ/kg. A single photon from a blue laser (about 400 nm) with an energy of about 2.48 eV has an energy density of about $9.6 \times 10^{-7}$ MJ/kg. In the case of light photons the volume is defined by the wavelength of the light photon. Thus, it takes interactions from about $1.3 \times 10^9$ blue light (UV) photons to equal the energy density of one neutron knock-on collision.

The detection of nuclear particles from tensioned metastable states requires the induction of appropriate levels of negative pressures. This is distinct from that for the famous "bubble-chamber" as used for the superheated droplet detector (SOD) where the liquid is put above its boiling point. In the system according to embodiments of the present disclosure, the liquid remains at room temperature. The principle of detection for fluids in tension metastability is based on an analogy with stretching of structures. The greater the degree of tension the easier it becomes to tear the bonds holding the material together. In an analogous manner, the greater the degree of negative pressure imparted to the molecules and atoms of the working fluid, the easier it becomes to tear the bonds holding the molecules together (i.e., to then cause localized bubbles to form which can grow from nanometers to relatively large, multi-mm size pockets before redissolving on implosion). The sensitivity of detection is based on the degree of imparted tension and the value of spatial energy deposition from a given incident nuclear particle, or, dE/dx.

ATMFD Design

Figure 11A:
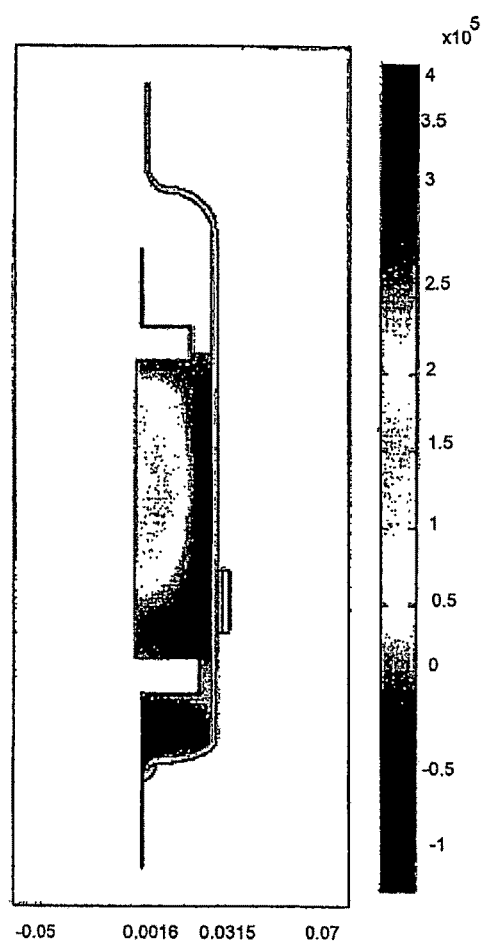
FIG. 11 is a schematic view of pressure distributions in chamber about 4.5 W (a) and about 10 W (b).
Figure 11B:
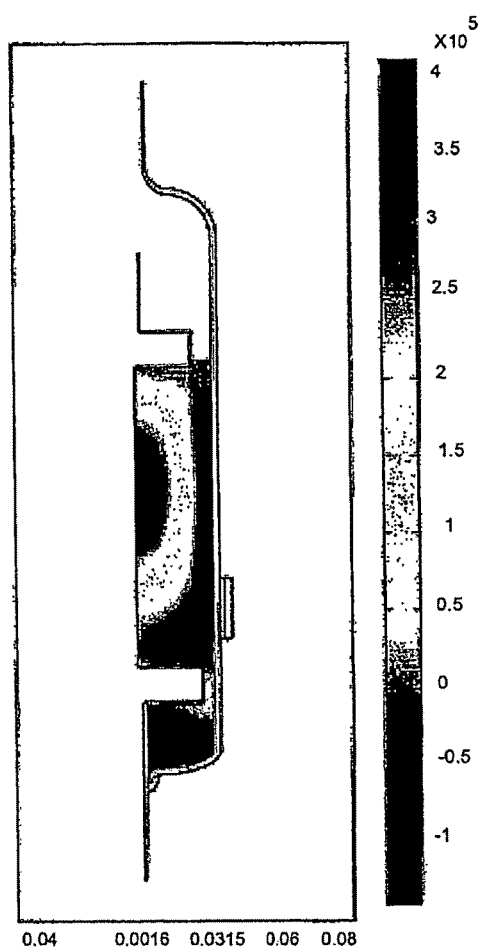
Figure 12:
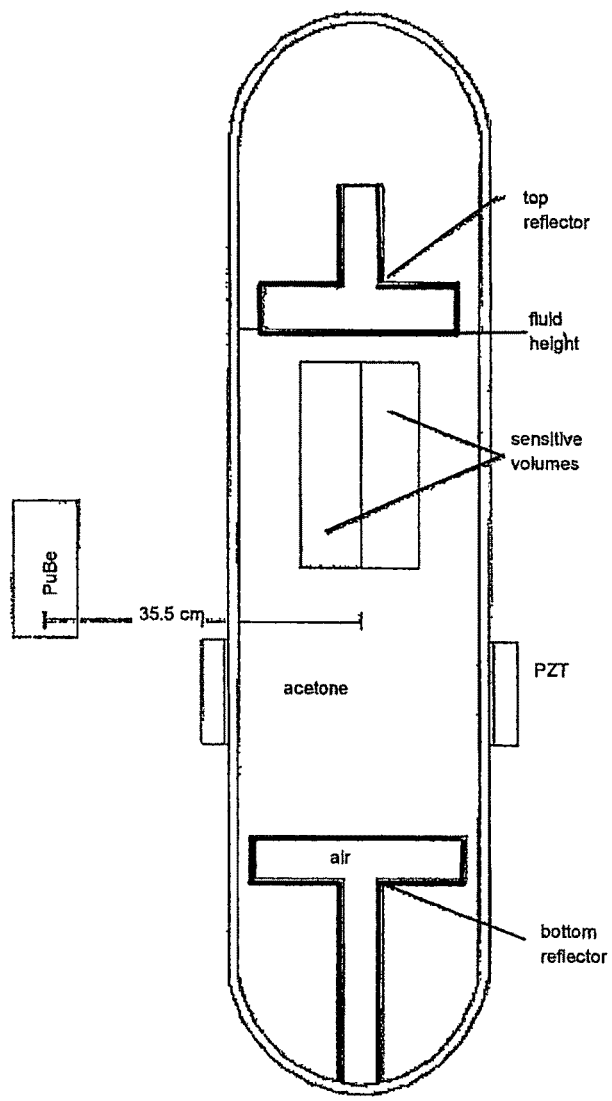
FIG. 12 is a not-to-scale view of the geometry of MCNP input.

Another embodiment of the ATMFD system, shown schematically in FIGS. 11 and 12, is a resonant acoustic system comprised of a (approximately 60 mm OD, 150 mm long) cylindrical glass, preferably Pyrex glass, resonant chamber powered by a concentrically affixed ring shaped piezoelectric transducer. A sinusoidal signal amplified by a linear amplifier drives the piezoelectric transducer. Reflectors placed at the top and bottom of the chamber aid in energy focusing by the formation of a standing pressure wave. In this embodiment four (approximately 7 mm OD) disc-shaped piezoelectric transducers were fixed to the outer wall of the cylindrical portion of the chamber and used to detect the shock wave spectra generated by radiation induced cavitations occurring in the sensitive volume of the detector.

The sensitive volume of the ATMFD is defined as the region in which the magnitude of the tension (negative) pressure is below a certain threshold value for which critical size vapor nuclei can be formed via energy deposition by incident nuclear particles colliding with the metastable state molecules.

Modeling and Simulation

Two simulation tools can be used in the characterization of the ATMFD system: COMSOL® multiphysics a finite element multiphysics program and MCNP5—a nuclear particle transport code. COMSOL® allows for the coupling of acoustic, fluid, and structural models of the resonant acoustic system. MCNP can be utilized to evaluate the combined spatial and energy dependent physical aspects effecting the neutron flux and energy spectrum over the sensitive volume of the ATMFD.

Finite Element Simulation

A numerical model using COMSOL® which is based on finite element methods, can be developed for frequency domain analyses and the results from the model can be compared with experimental data. The multiphysics model set here utilizes COMSOL's® structure mechanics module including stress-strain and piezoelectric effects analysis and the acoustic wave transport module together with modeling of electromagnetic coupling.

We assume that the system is axi-symmetric. In an embodiment the detector liquid is chosen to be pure acetone at about 25° C. The values for various properties of acetone are listed in Table 1.

TABLE 1

PROPERTIES OF ACETONE AT 25° C.

| | |
|---|---|
| Density (kg/m$^3$) | $0.786 \times 10^3$ |
| Viscosity (Pa s) | $0.308 \times 10^{-3}$ |
| Sound velocity (m/s) | 1174 |
| Bulk viscosity (Pa s) | about $1.5 \times 10^{-3}$ |

A similar model, which uses ethylene glycol as the liquid, has been benchmarked against experimental data for the pressure distribution and frequency spectra response. In the present embodiment, we keep the same physical domain settings and boundary conditions of the benchmarked model; changing the properties of the liquid and the structure of the system and introducing structural fluid damping.

Due to the large variations of dimensions between structure and liquid, the maximum relative size of mesh finite elements in liquid and solid regions are about 0.003 and about 0.017, respectively. The meshed structure embodied a total of about 5237 elements. Numerical convergence has been checked by use of finer meshing (about 20948 elements).

In order to visualize the relation and accompanying variations between the power driving the system and the sensitive volume in the chamber, the oscillating pressure distributions are plotted in FIG. 11 at the resonant frequency of about 18.85 kHz.

As shown in FIG. 11, the sensitive volume of the ATMFD can be varied by varying the drive voltage. Various other options also become feasible (e.g. using higher modes or superposition). Such a modeling approach can be utilized for designing and devising an as-needed ATMFD with desired levels of detection sensitivity along with ability to derive directionality information.

Monte Carlo Simulation

A system model can be developed for nuclear particle transport assessments using the MCNP5 code and shown in FIG. 12. It consists of the ATMFD's resonant chamber and a PuBe neutron source (emitting about $2 \times 10^6$ n/s). The chamber is substantially axial-symmetric. All structural material including the reflectors can be quartz glass, the piezoelectric transducers can be lead zirconate titanate (PZT), and the representative detection fluid can be acetone ($C_3H_6O$). The portion above the top reflector, inside the top and bottom reflectors and outside the chamber is modeled as air.

Two regional sensitive volumes are defined in the detector fluid as seen in FIG. 12. The cylinder (r=about 1.5 cm and h=about 4 cm) defining the entire sensitive volume is divided into substantially two halves; one half facing the source (V1) and one half facing away from the source (V2). The two half cylinders form the neutron tally volumes.

The neutron energy spectrum for a bare PuBe source is used and all cross sections are evaluated at about 300 K. The source is placed about 35.5 cm from the central axis of the chamber to be consistent with the experimental configuration.

Results of MCNP5 simulations demonstrate about a 25% increased probability of neutron interactions in the direction of the incident neutron source. This result confirmed estimates from first principle estimates.

By comparing the solid angles subtended by the two sensitive volumes to the PuBe source, one can see that the spatial effect for neutron flux amounts to about a 15% higher flux in V1 than V2. In comparison, down scattering accounts for about a 10% higher fast neutron flux in V1. This indicates that even if the source is further away, effectively negating the solid angle dependence of the neutron flux, detection in the ATMFD (as presently disclosed) will still be preferential and discernable as favoring to the side nearest to the source.

Automation

The collapse of the imploding vapor cavity formed by a nuclear particle interaction causes an audible click that can be heard several feet away from the chamber. The audible clicks from the collapsing cavities can be readily recorded using the piezoelectric transducers which can be affixed to the outside of the chamber. Recording the time that the shock wave reaches each transducer then allows the time difference of arrival (TDOA) to be calculated. The TDOA between transducers can be used in conjunction with a hyperbolic positioning algorithm to calculate the actual position of the bubble cavitation events.

The electrical signals from these cavitation events can first be sent through a third order Butterworth high pass filter to eliminate the dominate drive frequency therefore isolating the high frequency components. The signals from the filter can then be sent to an oscilloscope, such as an Agilent™ 100 MHz digital storage oscilloscope, for display, storage and further signal processing. A screen shot of the actual signals used in the experiment is shown in FIG. 13.

Figure 13:
FIG. 13 is a schematic view of the oscilloscope trace of cavitation shock waves. The vertical scale of first signal is about 20 mV and the second signal is about 200 mV. The horizontal scale is about 50 ms/div.
Figure 14:
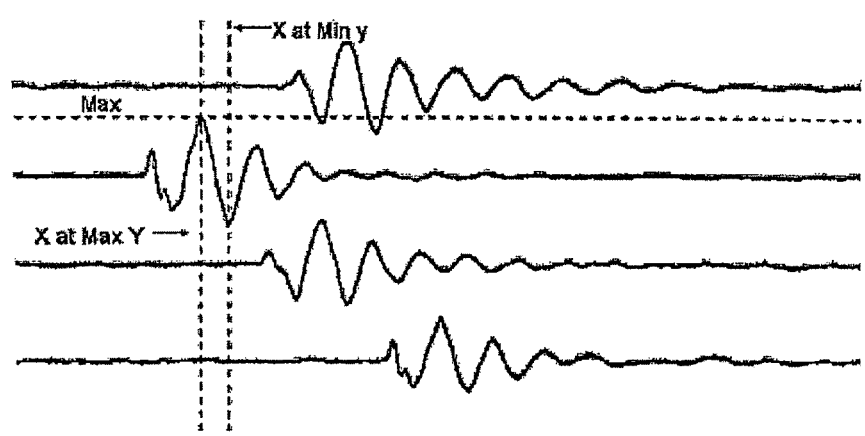
FIG. 14 is a schematic view of the screenshot of shock pulses analyzed for directionality information.

The first channel shown in FIG. 13 is the unfiltered transducer signal. The second channel is the corresponding signal after the high pass filter. The peaks in the signal are the unmistakable results of a recorded cavitation pulse. A LABVIEW® program was created as a graphical user interface with the oscilloscope. Using the LABVIEW® program the oscilloscope was set to run until the analog signal on the triggering channel crossed a predetermined threshold level. From the screenshot of the oscilloscope, several measurements are acquired; XatMaxY (time in us of the highest peak relative to the trigger point), XatMinY (time in μs of the lowest peak relative to the trigger point), and Maximum (maximum voltage recorded in the screenshot). Actual screenshots of typical signals used are shown in FIG. 14.

The measurements XatMaxY and XatMinY serve two purposes. These measurements allow for the calculation of the TDOAs between signals and for an estimation of the frequency of the cavitation pulse as recorded by each transducer. The maximum, voltage measurement ensures that the height of the cavitation signals on all four channels is larger than the triggering level. The values of the TDOAs, frequency, and maximum voltage of each cavitation pulse as recorded by the transducer were used as constraints to determine whether the signal analyzed is that of a cavitation pulse.

Data Constraints

The TDOA constraint was set using a numerical analysis of a hyperbolic positioning algorithm. A LABVIEW® computer program can be used to generate a random sample of cavitation events inside the chamber. The cavitation positions are then used to calculate the TDOA that each transducer would record. The TDOAs are then analyzed with a hyperbolic positioning algorithm. Upper constraints are set on the TDOAs used in the data set to investigate what TDOAs would result in a cavitation position mapped outside of the modeled sensitive volume of the chamber as mentioned earlier. The results are shown in Table 2. Therefore the upper constraint for TDOAs of about 20 µs resulted in cavitations within about 2 cm of the central axis of the chamber, and is consistent with experimental findings.

TABLE 2

DATA CONSTRAINTS USED FOR TDOA CALCULATIONS

| TDOA Constraint | Maximum Radius of Zone |
| --- | --- |
| 15 µs | 1.57 cm |
| 20 µs | 1.97 cm |
| 40 µs | 2.95 cm |

The dominant frequency of the largest peaks in the cavitation pulse can be determined using the XatMaxY and XatMinY measurements. As seen in FIG. 14, the XatMaxY and XatMinY measurements should occur at the peaks of the cavitation pulse with the greatest magnitude. The frequency constraint can be experimentally investigated using LABVIEW® software and the oscilloscope. A LABVIEW® program can be designed to record substantially the entire analog waveform of a cavitation pulse. An experimental data set of about 100 cavitation based neutron detection events can be recorded for analysis. Fast Fourier Transforms are then done on the cavitation waveforms. It was found that the dominant frequency of the largest peaks in the cavitation pulse is about 300 kHz. A lower constraint of about 200 kHz can be used to determine whether or not the signal recorded contained a cavitation pulse. A large range of frequencies are accepted because the recorded cavitation frequencies vary according to the cavitation strength, the distance to the recording transducer, the frequency response of the transducer (due to manufacturing), and the level of dampening in the chamber (due to scattering centers e.g. vapor or gas bubbles).

The maximum voltage measurement allowed for a minimum voltage constraint in order to eliminate triggering bias was discovered in initial experiments done by hand calculations and is explained later. The minimum voltage constraint can be set using experimental data. The maximum voltage identified from about 450 cavitations was recorded by all four transducers using a PuBe neutron source. In order to eliminate any maximum voltage bias due to source position, four sets of data are taken with the source about +35.5 cm and −35.5 cm away from center of the chamber on the X-axis with transducers 1 and 3 and on the Y axis with transducers 2 and 4. The average maximum voltages of the cavitations recorded are shown in Table 3.

TABLE 3

RECORDED AVERAGE MAXIMUM VOLTAGE MICROPHONE RESPONSE TO CAVITATION SHOCK EVENTS

| | Mic 1 | Mic 2 | Mic 3 | Mic 4 |
| --- | --- | --- | --- | --- |
| Source 1 | 716 mV | 692 mV | 703 mV | 667 mV |
| Source 3 | 697 mV | 702 mV | 716 mV | 661 mV |
| Average | 707 mV | 697 mV | 710 mV | 664 mV |

Figure 15:
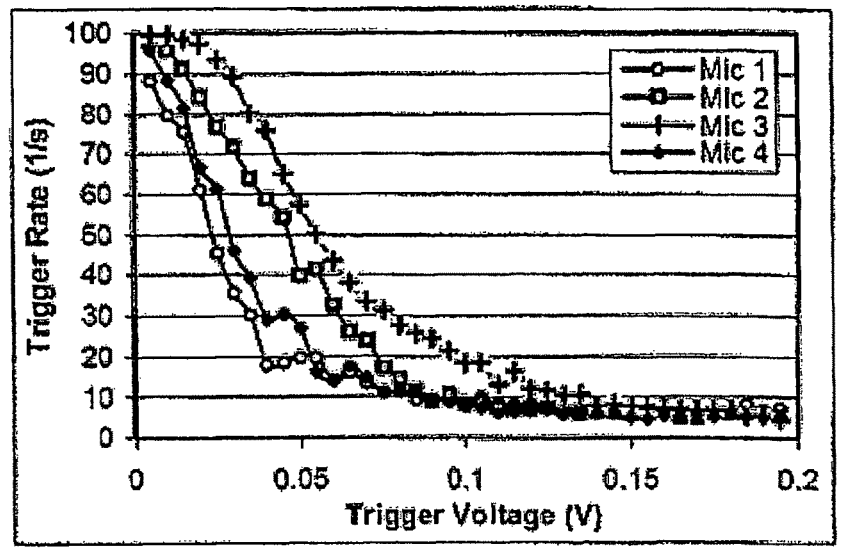
FIG. 15 is a schematic view of the trigger rate recorded by each transducer for various triggering levels.

The average maximum voltage of a cavitation pulse can be used to set trigger levels for each transducer. Only cavitations that have maximum voltages larger than the trigger levels for all four transducers are recorded for analysis. This method allows the oscilloscope to essentially trigger on all four signals at once, therefore eliminating any trigger bias. The initial results indicate that the trigger levels are within about 6% of each other, therefore the same trigger levels could be used for each transducer. Early experimental results indicate that the triggering levels used influence the accuracy of the results. To investigate the effect, a LABVIEW® program can be designed to record the rate of cavitations as recorded by each transducer as the trigger level is varied from about 5 mV to 195 mV. The results are shown in FIG. 15.

The experimental results indicate that triggering rate was unstable for small triggering voltages up to about 100 mV and stabilized around about 200 mV. Therefore a triggering level of about 200 mV can be used as a baseline for this embodiment. Due to variations in manufacturing tolerances and variability in use of epoxy or some other material to attach the pill microphones, the precise trigger level can now be developed using the method just described.

Directionality Determination Experimentation and Results

Figure 16:
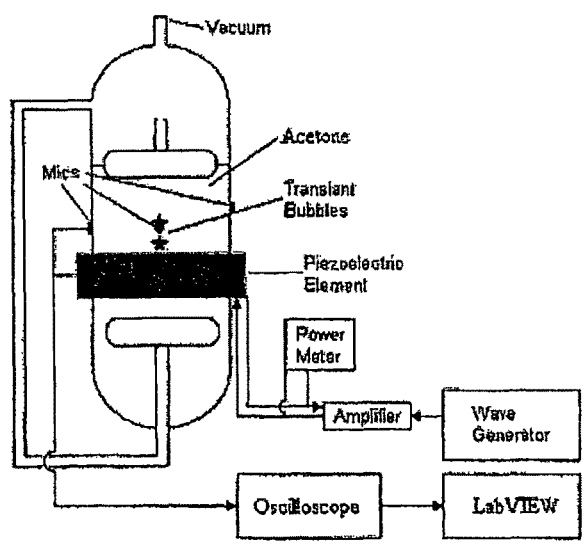
FIG. 16 is a schematic view of the experimental setup with directionality automation.

The experimental setup utilized a quartz ATMFD chamber with diameter of about 6.9 cm, as described in MCNP and COMSOL® models. The liquid used in the chamber was pure acetone at about 25° C. and under about 20 in. Hg of vacuum. The chamber was operated with a wave-form generator and a linear amplifier. The resonant frequency was found at about 18.3 kHz, and the drive voltage used was about 100 V. Data were taken utilizing an oscilloscope which recorded the shock traces. The LABVIEW® program mentioned earlier controlled the operation of the oscilloscope and collected the data. Communication with the oscilloscope can be accomplished via a GPIB interface. Four piezoelectric transducers were placed at right angles to each other on the same XY plane, with the exception of the fourth transducer which was placed with a positive Z component to allow for 3-D positioning. The setup is shown in FIG. 16.

Figure 17:
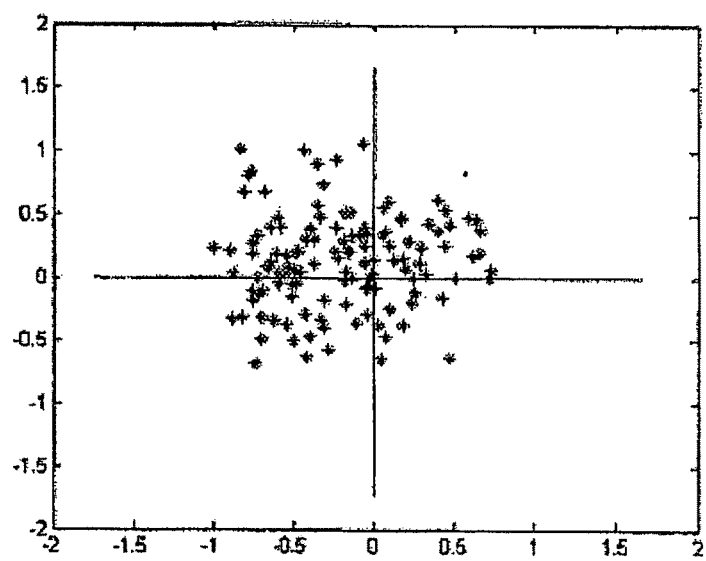
FIG. 17 is a schematic view of data taken manually with 4 channel 100 MHz 100 MSa/s oscilloscope.

Data were first taken utilizing an oscilloscope which recorded the cavitation pulses. The TDOAs were recorded manually with the oscilloscope cursors. The TDOAs were then analyzed with a hyperbolic positioning algorithm as mentioned earlier. The preliminary data (shown in FIG. 17), with the PuBe source about 13 cm away from the center of the chamber on the X axis, provided evidence that the location of the cavitation events in the chamber of the detector was convincingly biased towards the direction of the radioactive source.

The chamber can also be divided into two equally sized sections. The section closest to the source comprises about 65% (84/124) of the cavitation events, and about 32% (40/124) of the cavitation events occurred in the section furthest away from the source. This resulted in a ratio of about 2.1:1

(2.1). It was also discovered that a bias towards the triggering signal occurs. This triggering bias occurs because the data set was taken while triggering on only one signal. The triggering bias occurs because the cavitations closer to the triggering transducer have greater recorded shock signal amplitudes; therefore the cavitations that occur close to the triggering transducer may be preferentially biased. However, this trigger bias can be eliminated if all four transducers are used to trigger a cavitation event. This method of recording cavitation positions is inefficient, and taking data by hand only allowed for approximately 2 Sa/min to be recorded. Therefore, an automation system that allows for processing of significant amounts of data was designed and used thereafter. However, the manually obtained data serves as confirmation of the ability to offer directional information and also serves as a benchmark.

The data taken using the automated system are analyzed with the hyperbolic positioning algorithm mentioned earlier as well as with a Lab VIEW LABVIEW® program designed to keep track of how many times each transducer recorded the cavitation pulse first. A count of how many times two of the transducers recorded the cavitations first is listed in Table 4.

TABLE 4

RESULTS TAKEN WITH PuBe SOURCE PLACED 35.5 cm FROM CENTER AXIS OF CHAMBER ON-AXIS WITH MIC 1 AND MIC 3

|  | Mic 1 | Mic 3 |
| --- | --- | --- |
| Source at 1 | 88 | 65 |
| Source at 3 | 71 | 82 |

Figure 18:
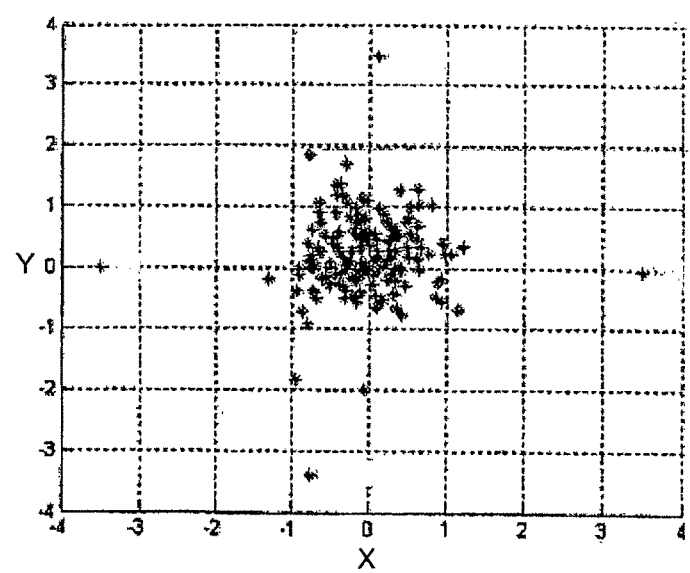
FIG. 18 is a schematic view of positions of cavitation events using PuBe source about −35.5 cm away from center axis of chamber in line with Mic 1 and Mic 3.
Figure 19:
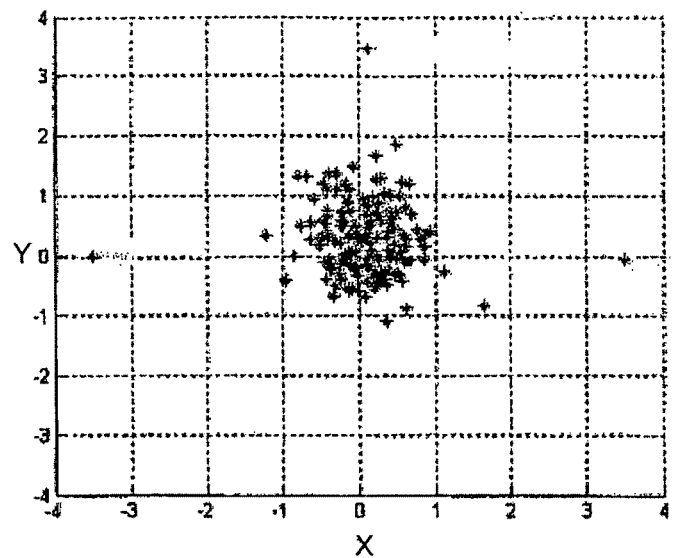
FIG. 19 is a schematic view of positions of cavitation events using PuBe source about +35.5 cm away from the center axis of the chamber in line with Mic 1 and Mic 3.

The chamber again can be divided into two equally sized sections. The section closest to the radioactive source contains about 56% (170/306) of the cavitation events, and about 44% (136/306) of the cavitation events occur in the section furthest away from the source. The resulting ratio of cavitation events is given as about 5:4 (1.25). These results correlated with the results previously taken by hand, and with the theoretical value given by the MCNP model (about 1.24). The difference between the counts taken by the computer and by hand can be attributed to the elimination of the trigger bias by setting a lower constraint for the maximum voltage of the cavitations. The TDOAs recorded are also used to calculate the positions of the cavitations and are in FIGS. 18 and 19.

The graphs are also divided into two substantially equally sized sections. The section closest to the radioactive source contains about 56% (170/306) of the cavitations, and about 44% (136/306) of the cavitation events occur in the section furthest away from the cavitation source. The resulting ratio of cavitation events is given as about 5:4 (1.25). It is noted that the data using the first transducer of arrival method and the hyperbolic position method correlate with about 100% accuracy, and also correlate to the theoretical model estimates (i.e., MCNP5 and COMSOL®) to within about 2%.

Figure 20:
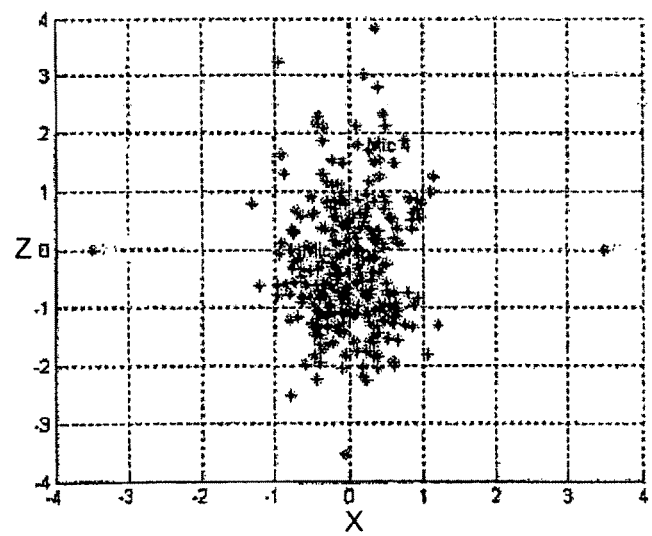
FIG. 20 is a schematic view of all cavitation events as recorded, seen in the xz plane. Data taken with source about −35.5 cm and 35.5 cm away from the center of chamber on x-axis with Mics 1 and 3.

A graph was also prepared which included all cavitation events recorded, with the radioactive source about −35.5 cm and 35.5 cm away from the center of the chamber on the X-axis with Mics 1 and 3. The graph of the cavitation events as seen in, the XZ plane shows that the sensitive volume of the chamber was similar in size and shape to the developed COMSOL® mode (FIG. 20). It can be seen that all neutron detection (cavitation events) occur within a radius of about 1.5 cm from the centerline of the ATMFD, which corresponds very well with the predictions of the COMSOL® model. Therefore, the value of about 1.5 cm is used for MCNP calculations.

Figure 21A:
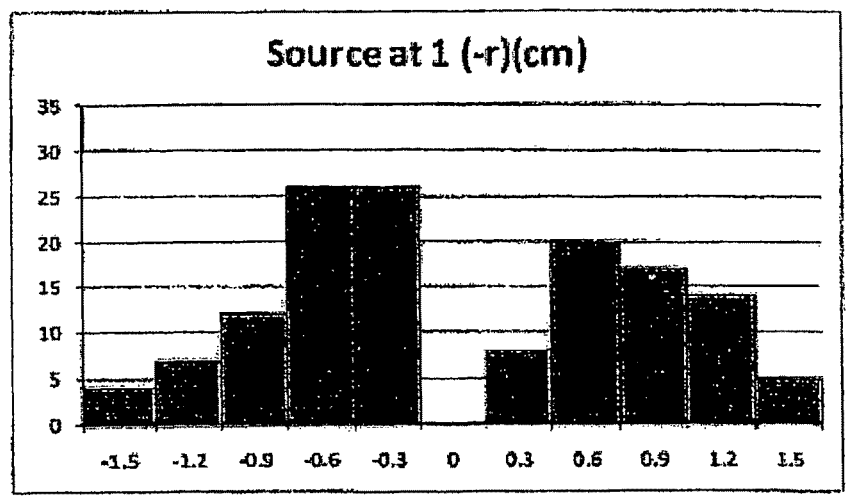
FIG. 21 is a schematic view of radial distribution of cavitation events, separated into two sections (closest to source and furthest from source); (a) data taken with source about −35.5 cm away from the center of the chamber on the x-axis; (b) data taken with source about 35.5 cm away from the center of the chamber on the x-axis.
Figure 21B:
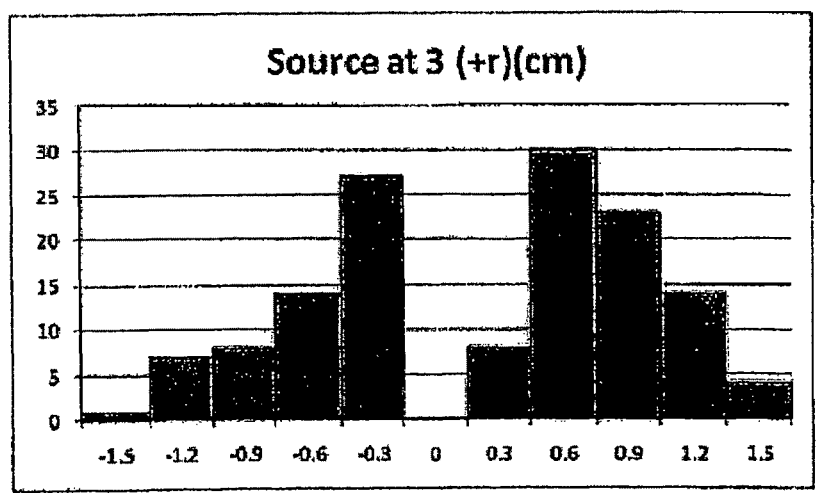
Figure 22:
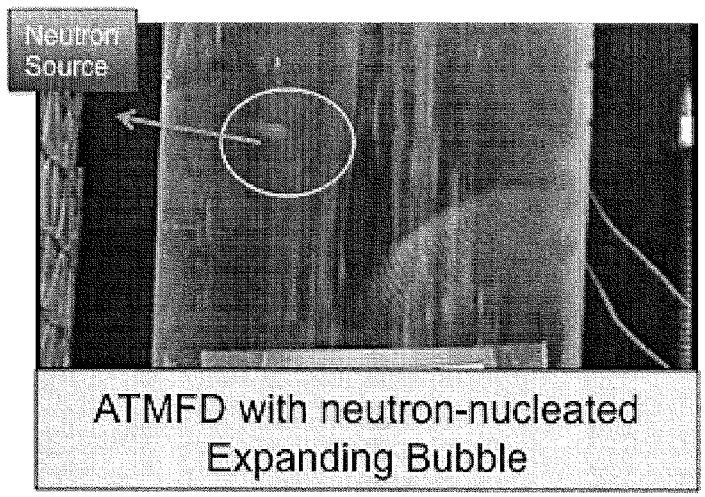
FIG. 22 is a picture of an elongated bubble in an ATMFD pointing to the source of incoming (in this case neutrons from a Pu—Be isotopic source) radiation.

The radial (spatial) distribution of the cavitation locations was also analyzed. The cavitation events are distributed into substantially two equal parts; the half of the chamber closest to the source, and the half of the chamber furthest away from the source. The radial positions were then tabulated in a histogram, which resulted in the number of cavitations in opposing concentric arcs. The results are shown in FIGS. 21*a* and 21*b*.

The center section of the chamber, which has the greatest tension (negative) pressure, was eliminated from this count, because this location is where cavitation events preferentially occur, and the error in the hyperbolic positioning algorithm is the greatest. Therefore the cavitations that occurred in this section of the chamber contribute the least to directional information. The resultant counts show that about 56% (154/274) of the cavitation events occurred in the section closest to the source, while about 44% (120/274) occurred in the section furthest from the source, equivalent to a ratio of 5:4 (1.28). This method of data analysis provides for improved and better capability for deriving directional information, when compared to the simpler first transducer of arrival method.

A related means for determining directionality of incoming radiation is possible from visual inspection of bubble shapes. It is found that radiation from a source such as a Pu—Be source of neutrons delivers energy from the radiation to the nuclei of atoms in the direction of the source to give rise to nanoscale bubbles which grow to macroscopic visible sizes. In an oscillating acoustically-driven field, the tiny bubbles grow to macroscopic sizes in the multi mm range in the ATMFD systems discussed earlier and then elongate themselves in elliptic shape transporting themselves radially outward towards the glass walls via acoustic pressure gradient prior to dissolving and disappearing. The major axis of the elongated bubble cluster (formed in an ATMFD system) from neutron induced collision with nuclei of acetone is pointing towards and is in line with the neutron source. Observation of movie clips taken with a 1,000 fps camera as well as with a conventional 30 fps video camera indicates that approximately 8 of every 10 of the bubble clusters point in this preferential direction. Some of the incoming neutrons striking the tensioned liquid molecules can be expected to come as reflected neutrons from other angles, or also to strike the nuclei of target atoms of the fluid at grazing angles, and hence, may be expected to give rise to elliptically transported bubbles in various other directions away from the true source of radiation. Nevertheless, this finding gives rise to the possibility for determining directionality on a relatively instant (within seconds) reliable basis by direct visual image monitoring and analysis inspection of the transient bubble clusters. Such a system would also become extremely valuable in situations involving very low intensity radiation arriving at the detector (e.g., from well-shielded nuclear materials) whereby, use of the TDOA based technique becomes impractical for real-time monitoring of directionality.

SUMMARY AND CONCLUSIONS

In both the first transducer of arrival and the hyperbolic positioning methods used, the neutron detection as evidenced by location of cavitation events (in an ATMFD with at about 70 mm OD) preferentially occurs on the side of the detector nearest the source both with a ratio of about 1.25:1. Down-scattering events in chambers of this size plays an important role in permitting reliable discerning of directionality; larger ATMFDs can lead to even higher confidence levels and in less time. Therefore, it is discernable that the addition of the hyperbolic positioning algorithm, which allows for mapping of the cavitation events in 3D, does not increase the error involved. The ability to map the cavitation events in three dimensions signifies that there is not only the ability to detect 2D directionality, but also 3D directionality information.

Cavitation events are found to occur preferentially on the side of the detector nearest to the source with a ratio of about 1.25:1 compared with predictions from the multiphysics based simulations (about 1.24:1). These ratios are for a source to detector distance of about 35.5 cm. Calculations confirm that for this distance the increase in solid angle from the sensitive volume nearest the source to furthest from the source accounts for about a 15% reduction in neutron flux. This means that down scattering of the neutrons through the acetone (even for an approximately 6 cm OD ATMFD system) accounts for a very significant (approximately 10%) effect. Larger ODs will allow for greater ability for directionality. Therefore, directional information may be obtained even when the source is far enough away such that solid angle effects on the magnitude of the neutron flux are negligible.

Our COMSOL® coupled physics simulation shows the ability to scale the sensitive volume of the detector by increasing the drive power and yielding increased confidence directional information in less time than the baseline case.

ATMFD may be insensitive to gamma radiation and by changing the liquid to be composed of Cl or B nuclei (Freon-113 or tri-methyl borate) the ATMFD can also be simultaneously used to detect neutrons/radiation with directionality with energies from thermal to fast and approximately 100% intrinsic efficiency has also been demonstrated for TMFD systems.

Radiation collisions with nuclei of TMFD systems deliver energy in preferential directions that coincide to a large extent with the direction of arrival on to the nuclei of atoms of liquid molecules of the TMFD system. Tension pressures amplify the bubbles from nanoscale to the multi-mm scales in such way that bubbles can deform to elongated and approximately cylindrical comet-like shapes with the major axis substantially pointing in line with the direction of incoming radiation.

While the present disclosure has been described with reference to certain embodiments, other features may be included without departing from the spirit and scope of the present invention. It is therefore intended that the foregoing detailed description be regarded as illustrative rather than limiting, and that it be understood that it is the following claims, including all equivalents, that are intended to define the spirit and scope of this invention.

The invention claimed is:

1. A method of determining directionality of radiation comprising, creating a volume of a tensioned metastable fluid in a chamber;
   placing the tensioned metastable fluid volume in the proximity of a radiation source;
   detecting the location of radiation induced cavitations within the tensioned metastable fluid; and
   determining the direction of the radiation source based on the radiation induced cavitations within the tensioned metastable fluid; wherein the step of detecting the location of radiation induced cavitations comprises detecting the time delay of the arrival of cavitation induced shock signals by processing signals obtained from a plurality of signal detection transducers mounted on the chamber.

2. The method of determining directionality of radiation of claim 1, wherein the volume of tensioned metastable fluid has a shape that contains at least one axis of symmetry.

3. The method of determining directionality of radiation of claim 1, wherein the tensioned metastable fluid is an acoustically tensioned metastable fluid.

4. The method of determining directionality of radiation of claim 1, wherein the step of detecting the location of radiation induced cavitations comprises detecting cavitation induced shock signals by processing signals obtained from a plurality of signal detection transducers mounted on the chamber wherein the processing further comprises a step to minimize bias.

5. The method of determining directionality of radiation of claim 1, wherein the step of detecting the location of radiation induced cavitations comprises detecting cavitation induced shock signals by processing signals obtained from a plurality of signal detection transducers mounted on the chamber wherein the processing further comprises a step to minimize bias that includes the step of detecting signals from the signal detection transducers that are above a threshold voltage level, wherein the threshold voltage level can be determined from an asymptotic response comparison of all transducers.

6. The method of determining directionality of radiation of claim 1, wherein the step of detecting the location of radiation induced cavitations comprises the method of detecting the location of cavitations by a hyperbolic positioning method.

7. The method of determining directionality of radiation of claim 1, wherein the step of detecting the location of radiation involves determining a ratio of cavitations occurring in at least two regions of the chamber.

8. The method of determining directionality of radiation of claim 1, wherein the chamber has a centerline vertical axis and the method further comprises comparing cavitation events in opposing sectors of the chamber without including the event counts in a volume of space that includes at least a portion of the centerline vertical axis.

9. The method of determining directionality of radiation of claim 1, wherein the method further comprises using pressure differences to amplify the elongation of cavitation bubbles to coincide with direction of energy transfer to liquid molecules from the incoming radiation.

10. The method of determining directionality of radiation of claim 1, wherein the method further comprises monitoring the shape of the cavitation bubble nucleation events.

11. The method of determining directionality of radiation of claim 1, wherein the step of determining the direction of the radiation source comprises the step of determining the major axis of an elongated shape of cavitation bubbles induced by the radiation.

12. The method of determining directionality of radiation of claim 1, wherein the method further comprises visually determining the direction of incoming radiation from the major axis of an elongated cavitation induced bubble.

13. A device for determining directionality of incident radiation comprising:
   a chamber holding a fluid,
   a control system in communication with a mechanism for deforming the chamber that includes at least one drive transducer and the resonance frequency of the at least one drive transducer is substantially similar to the resonance frequency of the chamber;
   wherein the control system and the mechanism for deforming the chamber operate together to induce and maintain a tension metastable state in the fluid that is sufficient to allow the nucleation of bubbles when the fluid molecules are struck by incident nuclear particles and
   a plurality of signal detection transducers spaced apart within the chamber in electronic communication with a system for determining the location of bubble cavitation events within the fluid volume.

14. The device for determining the directionality of incident radiation of claim 13, wherein the chamber is sealed.

15. The device for determining the directionality of incident radiation of claim 13, wherein the fluid in the chamber is selected from the group of fluids consisting of acetone, freon, benzene, isopentane, trimethyl borate, and their mixtures.

16. The device for determining the directionality of incident radiation of claim 13, wherein the mechanism for deforming the chamber further comprises at least one transducer that includes a piezoelectric material.

17. The device for determining the directionality of incident radiation of claim 13, wherein the mechanism for deforming the chamber further comprises at least one transducer that includes a piezoelectric material comprising lead zirconate titanate.

18. The device for determining the directionality of incident radiation of claim 13, wherein the mechanism for deforming the chamber further comprises at least one transducer that includes a piezoelectric material comprising ceramic.

19. The device for determining the directionality of incident radiation of claim 13, wherein the mechanism for deforming the chamber further comprises at least one transducer that includes a piezoelectric material comprising barium titanate.

20. The device for determining the directionality of incident radiation of claim 13, wherein the mechanism for deforming the chamber includes at least one transducer mounted to the chamber such that it surrounds the circumference of the chamber around the mid plane or in a plane corresponding to a desired oscillating tension-cum-compression pressure field.

21. The device for directionality of incident radiation of claim 13, wherein the mechanism for deforming the chamber includes multiple transducers mounted to the chamber at discrete locations in a plane corresponding to a desired oscillating tension-cum-compression pressure field.

22. The device for determining the directionality of incident radiation of claim 13, wherein at least one drive transducer is an electrically driven piezoelectric element mounted to the chamber wall which is capable of introducing positive and negative pressure fluctuations within the fluid to establish resonance and a tension metastable state that is sufficient to allow the nucleation of bubbles when the fluid molecules are struck by incident nuclear particles.

23. The device for determining the directionality of incident radiation of claim 13, further comprising at least four signal detection transducers.

24. The device for determining the directionality of incident radiation of claim 13, further comprising at least three signal detection transducers in the same plane and at least one signal detection transducer that is outside that plane.

25. The device for determining the directionality of incident radiation of claim 13, wherein the system for determining the location of bubbles within the fluid volume include a signal processing system comprising a high-pass filter circuit that removes the baseline drive frequency signal.

26. The device for determining the directionality of incident radiation of claim 13, wherein the system for determining the location of bubbles within the fluid volume includes a signal processing system that compares filtered signals from the signal detection transducers to determine the arrival time delay of bubble signals at the signal detection transducers that employs a positioning algorithm to determine position of imploding bubbles within the chamber.

27. The device for determining the directionality of incident radiation of claim 13, wherein the system for determining the location of bubbles within the fluid includes a signal processing system that determines the number and location of bubble cavitations in the chamber.

28. The device for determining the directionality of incident radiation of claim 13 wherein the chamber has a size and shape that allows for the directional detection of radiation that permits down scattering assisted collection of cavitation events in various regions of the chamber.

29. A device for determining directionality of incident radiation comprising:
a chamber holding a fluid,
a control system in communication with a mechanism for deforming the chamber which operate together to induce and maintain a tension metastable state in the fluid wherein the tension metastable state is sufficient to allow the nucleation of bubbles when the fluid molecules are struck by incident nuclear particles and
a plurality of signal detection transducers spaced apart within the chamber in electronic communication with a system for determining the location of bubble cavitation events within the fluid volume comprising a signal processing system that determines the number and location of bubble cavitations in the fluid.

30. The device for determining the directionality of incident radiation of claim 29, wherein the chamber is sealed.

31. The device for determining the directionality of incident radiation of claim 29, wherein the fluid in the chamber is selected from the group of fluids consisting of acetone, freon, benzene, isopentane, trimethyl borate, and their mixtures.

32. The device for determining the directionality of incident radiation of claim 29, wherein the mechanism for deforming the chamber further comprises at least one transducer that includes a piezoelectric material.

33. The device for determining the directionality of incident radiation of claim 29, wherein the mechanism for deforming the chamber further comprises at least one transducer that includes a piezoelectric material comprising lead zirconate titanate.

34. The device for determining the directionality of incident radiation of claim 29, wherein the mechanism for deforming the chamber further comprises at least one transducer that includes a piezoelectric material comprising ceramic.

35. The device for determining the directionality of incident radiation of claim 29, wherein the mechanism for deforming the chamber further comprises at least one transducer that includes a piezoelectric material comprising barium titanate.

36. The device for determining the directionality of incident radiation of claim 29, wherein the mechanism for deforming the chamber includes at least one transducer mounted to the chamber such that it surrounds the circumference of the chamber around the mid plane or in a plane corresponding to a desired oscillating tension-cum-compression pressure field.

37. The device for directionality of incident radiation of claim 29, wherein the mechanism for deforming the chamber includes multiple transducers mounted to the chamber at discrete locations in a plane corresponding to a desired oscillating tension-cum-compression pressure field.

38. The device for determining the directionality of incident radiation of claim 29, wherein the mechanism for deforming the chamber comprises at least one electrically driven piezoelectric element mounted to the chamber which is capable of introducing positive and negative pressure fluctuations within the fluid to establish resonance and a tension metastable state that is sufficient to allow the nucleation of bubbles when the fluid molecules are struck by incident nuclear particles.

39. The device for determining the directionality of incident radiation of claim 29, further comprising at least four signal detection transducers.

40. The device for determining the directionality of incident radiation of claim 29, further comprising at least three signal detection transducers in a plane and at least one signal detection transducer that is outside that plane.

41. The device for determining the directionality of incident radiation of claim 29, wherein the system for determining the location of bubbles within the fluid volume includes a signal processing system comprising a high-pass filter circuit that removes the baseline drive frequency signal.

42. The device for determining the directionality of incident radiation of claim 29, wherein the system for determining the location of bubbles within the fluid volume includes a signal processing system that compares filtered signals from the signal detection transducers to determine the arrival time delay of bubble signals at the signal detection transducers that employs a positioning algorithm to determine position of imploding bubbles within the chamber.

43. The device for determining the directionality of incident radiation of claim 29 wherein the chamber has a size and shape that allows for the directional detection of radiation that permits down scattering assisted collection of cavitation events in distinct regions of the chamber.

* * * * *